US012018488B2

(12) United States Patent
Langston et al.

(10) Patent No.: US 12,018,488 B2
(45) Date of Patent: *Jun. 25, 2024

(54) SYSTEMS AND METHODS FOR CONCRETE SUPPORT POST-TENSIONING

(71) Applicant: POST TECH MANUFACTURING, LLC, Fort Worth, TX (US)

(72) Inventors: Evan Langston, Fort Worth, TX (US); Bryant Morgan, Maryland Heights, MO (US); Jeffrey Alan Cook, Dripping Springs, TX (US)

(73) Assignee: POST TECH MANUFACTURING, LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,154

(22) Filed: May 21, 2021

(65) Prior Publication Data

US 2022/0372761 A1 Nov. 24, 2022

(51) Int. Cl.
*E04C 5/12* (2006.01)
*E04C 5/16* (2006.01)
(Continued)

(52) U.S. Cl.
CPC ............... *E04C 5/122* (2013.01); *E04C 5/12* (2013.01); *E04C 5/125* (2013.01); *E04C 5/162* (2013.01);
(Continued)

(58) Field of Classification Search
CPC . E04C 5/162; E04C 5/12; E04C 5/122; E04C 5/163; E04C 5/161; F16B 7/182
See application file for complete search history.

(56) References Cited

U.S. PATENT DOCUMENTS

| 3,588,045 A | 6/1971 | Stubbs | |
| 3,833,706 A * | 9/1974 | Edwards | .................. E04C 5/12 52/223.13 |

(Continued)

FOREIGN PATENT DOCUMENTS

| CA | 3076651 A1 * | 9/2020 | ............. E04C 5/122 |
| EP | 2096223 A2 * | 9/2009 | ............... E04C 5/12 |

(Continued)

OTHER PUBLICATIONS

International Search Report; Application No. PCT/US2021/070192;dated Jul. 14, 2021; 1 page; Alexandria, Virginia, USA.

*Primary Examiner* — Jessie T Fonseca
(74) *Attorney, Agent, or Firm* — Whitaker Chalk Swindle & Schwartz, PLLC; Decker A. Cammack

(57) ABSTRACT

A system, method, and apparatus for post-tensioning in masonry-based system, especially concrete support systems. In one embodiment, a system is presented that can include an anchor, pocket-former, and bolt, wherein the pocket-former can be configured to engage each of the anchor and bolt to facilitate securing of the system to a form. In another embodiment, a method of post-tensioning is presented, wherein a tendon can be suspended at the live end via connections facilitated by a pocket-former. In another embodiment, a system and method of post-tensioning is presented that prevents a pocket and anchor from being contaminated with debris that could ultimately compromise the integrity of the tensioned material.

26 Claims, 18 Drawing Sheets

(51) Int. Cl.
*E04G 21/12* (2006.01)
*F16B 7/18* (2006.01)

(52) U.S. Cl.
CPC .............. *E04C 5/163* (2013.01); *E04G 21/12* (2013.01); *F16B 7/182* (2013.01); *E04C 5/161* (2013.01)

(56) References Cited

U.S. PATENT DOCUMENTS

| | | | | |
|---|---|---|---|---|
| 3,956,797 | A * | 5/1976 | Brandestini | E04C 5/122 52/223.13 |
| 4,053,974 | A * | 10/1977 | Howlett | E04C 5/122 52/223.13 |
| 4,773,198 | A * | 9/1988 | Reinhardt | E04C 5/122 52/223.13 |
| 5,072,558 | A * | 12/1991 | Sorkin | E04C 5/12 52/223.13 |
| 5,440,842 | A * | 8/1995 | Sorkin | E04C 5/12 52/223.13 |
| 5,897,102 | A * | 4/1999 | Sorkin | E04C 5/12 52/223.13 |
| 6,023,894 | A * | 2/2000 | Sorkin | E04C 5/122 249/43 |
| 6,322,281 | B1 | 11/2001 | Jungwirth et al. | |
| 6,393,781 | B1 * | 5/2002 | Sorkin | E04C 5/122 52/223.13 |
| 6,817,148 | B1 | 11/2004 | Sorkin | |
| 7,360,342 | B2 | 4/2008 | Hayes et al. | |
| 7,424,792 | B1 | 9/2008 | Sorkin | |
| 7,676,997 | B1 | 3/2010 | Sorkin | |
| D615,219 | S * | 5/2010 | Sorkin | D25/199 |
| 7,797,895 | B1 | 9/2010 | Sorkin | |
| 7,841,140 | B1 | 11/2010 | Sorkin | |
| 7,950,196 | B1 | 5/2011 | Sorkin | |
| 7,963,078 | B1 * | 6/2011 | Sorkin | E04C 5/122 403/374.1 |
| 8,069,624 | B1 | 12/2011 | Sorkin | |
| 8,087,204 | B1 * | 1/2012 | Sorkin | E04C 5/122 52/223.13 |
| 8,251,344 | B1 * | 8/2012 | Sorkin | E04C 5/122 52/223.13 |
| 9,163,405 | B2 | 10/2015 | Mathews et al. | |
| 2005/0284050 | A1 * | 12/2005 | Hayes | E04C 5/12 52/223.13 |
| 2009/0205273 | A1 | 8/2009 | Hayes et al. | |
| 2017/0016231 | A1 * | 1/2017 | Sorkin | B28B 23/043 |
| 2017/0204607 | A1 * | 7/2017 | Schmidt | E04C 5/122 |
| 2018/0155923 | A1 * | 6/2018 | Sorkin | E04B 1/66 |
| 2018/0291628 | A1 * | 10/2018 | Butts | E04C 5/125 |
| 2018/0313086 | A1 * | 11/2018 | Mathews | E04C 5/122 |
| 2019/0145103 | A1 * | 5/2019 | Brewer | E04C 5/12 52/223.13 |
| 2019/0242132 | A1 * | 8/2019 | Beaver | E04C 5/12 |
| 2021/0293023 | A1 * | 9/2021 | Sorkin | E04C 5/122 |

FOREIGN PATENT DOCUMENTS

| | | | | |
|---|---|---|---|---|
| EP | 3118386 | A1 * | 1/2017 | ............. E04C 5/122 |
| EP | 3222793 | A1 * | 9/2017 | ............. E04C 5/12 |
| EP | 3885507 | A1 * | 9/2021 | ............. E04C 5/122 |
| WO | WO-9111569 | A * | 8/1991 | ............. B29C 45/14 |

* cited by examiner

SYSTEMS AND METHODS FOR CONCRETE SUPPORT POST-TENSIONING

BACKGROUND

1. Field of the Disclosure

The present disclosure relates to a system, method, and apparatus for post-tensioning masonry-based support systems, such as concrete support systems. The disclosure discussed herein has applicability to systems that employ a simple two-anchor system having a dead end and a live end, as well as systems that employ intermediate anchors, such as would be need for high-strength and/or large slab applications.

2. Background of the Disclosure

Construction with concrete has been prevalent in both commercial and residential applications for more than a century. As construction methods have evolved, so has the composition and use of structural concrete. Concrete has enormous compressive strength, but historically has needed beam construction to support tensile and lateral strength. While simple and economical, a post-and-beam structure, designed to support floors and/or roofs made of concrete slabs, are unsightly, and unnecessarily reduce usable square footage within the square footage of the concrete slab by taking up valuable space. Accordingly, various methods have been created to increase the tensile strength of concrete. One method of increasing the tensile strength of concrete has been to add rebar, or steel rods, within the concrete. However, this method is only marginally successful at increasing the tensile strength.

Two of the simpler and more-effective slab-strengthening methods are known as pre-tensioning and post-tensioning. Pre-tensioning occurs in a controlled shop environment where strands of wire, or tendon, are stretched from end-to-end of a form, and then concrete is poured around the pre-stretched tendons. When the concrete cures, it adheres to the tendons, which provide compressive force along the axis of the tendon, thus increasing the tensile strength of the concrete slab.

Post-tensioning is a more cost effective and efficient method of reinforcing concrete slabs as compared to pre-tensioning. In post-tensioning, a tendon is anchored at one end of a slab form—a fixed end—and is laid along an axis of the form in an unstressed state. The tendon is housed in a sheath, which allows the tendon to move freely within the sheath. In most cases, the tendon is surrounded by heavy grease to assist its longitudinal movement within the sheath. Concrete is then poured within the form surrounding the tendon. Once the concrete has been poured into the form at the construction site, the tendon is tensioned with a jack at an anchor at the opposite end of the tendon from the fixed end. This second anchor is known as the "live end." The live-end anchor is generally attached to a form or form board via nails that are driven through holes in the anchor and into the form, securing the anchor to the form. Other methods utilize a hollow tube that extends through both the form board and pocket former to affix itself to the anchor, with the tendon running the length of the tube. There may be one or more intermediate anchors within the slab, depending on the span covered by the tendon. Typically, strands of tendons are placed perpendicular to one another to tension the concrete slab along both a vertical and horizontal axis along the plane of the slab. The benefits to post-tensioning are numerous.

First, post-tensioning allows the slab to be formed and poured on site, ensuring that the form is exactly correct in its dimensions. Second, because the slab is poured on site, transportation costs are reduced because finished pre-tensioned slabs require extremely large vehicles to move them from shop to site. Additionally, but not exhaustively, pre-tensioning is dangerous in a shop environment, because thousands of pounds of force are applied to a pre-tensioned tendon with nothing to prevent it from harming workers in the event it snaps before the concrete is poured. In post-tensioning, the tendon is unstressed when the concrete is poured, so in the event of a tendon failure during tensioning, it is surrounded by a large amount of concrete, which prevents the tendon from whipping out of the form.

When the post-tensioning system is tensioned, a tail of tendon extends through the live-end anchor. Typically, a jack is affixed to the end of the tendon at a device called a pocket former. The pocket former ensures that once the concrete is poured, there is sufficient space to install the jack by preventing the ingress of concrete into the area where the tendon protrudes through the live-end anchor. Wedges are installed around the tail of the tendon, which will have no sheathing. The wedges typically have beveled "teeth" facing the tail end, such that when the tendon is released, the wedges in the anchor cavity seat, grab the tendon by biting into the metal cable strands, and prevent the tendon from retracting after tensioning. Once the desired tension is achieved, the tendon is cut as close to the anchor cavity as possible.

One significant problem with both pre-tensioned and post-tensioned systems is corrosion. Concrete slabs are used in a variety of applications, almost all of which are exposed to the elements at some point. Because the cables must be made of mild steel or a similar material (to allow for stretching and tensioning), and the use of stainless steel for cables and anchors is cost-prohibitive, corrosion is a concern. Accordingly, the use of sheathing for the tendons and polymer encased anchors has become standard practice in the post-tensioning industry. Further, after a tendon is sheared, it is advisable to cover the severed tail (and the inside of the anchor from which it protrudes) to protect the components from corrosion.

Because of this issue with corrosion, another problem with current anchors is the use of nails to affix the anchors to the form boards. Most construction workers are incentivized to work very quickly. Therefore, as they are nailing the anchors into the form boards, nails are often not driven perfectly straight, comprising the integrity of the connection to the form; further, when hammered, the nails may tear the polymer encapsulation about the anchor. In such a case, the polymer is compromised, potentially exposing the anchor to corrosive elements. Additionally, other potential methods of securing anchors to forms are not efficient, potentially requiring an elongated hollow bolt that travels all the way through a pocket-former and into an anchor. Such contraption can be problematic because of the seal (or lack thereof) between the pocket-former and anchor if this seal is not accomplished correctly, slurry can egress into the cavity and interfere with the tensioning of the cable, as well as ultimately compromise the integrity of the post-tensioning system by contaminating the interaction between the anchor and the tendon.

SUMMARY OF THE INVENTION

In one embodiment, the present disclosure can comprise a post-tensioning system. The system can comprise an anchor member; a pocket-former member comprising a first end and a second end; and a bolt member comprising a first end, a second end, and a flange. The first end of the pocket-former member can be configured to engage the anchor member, and the second end of the pocket-former member can be configured to engage the second end of the bolt member.

In another embodiment, the present disclosure comprises a method of providing support to a masonry structure. The method can comprise the steps of: providing an anchor member; engaging it the anchor member with a first end of a pocket-former member; and engaging a second end of the pocket-former member with a bolt member, wherein engaging the pocket-former member with the bolt member secures the pocket-former member to a form.

In another embodiment, the present disclosure can comprise a pocket-former apparatus. The apparatus can comprise a pocket-former member comprising a first end, a second end, an inner tube, and an outer tube; an anchor member; and a bolt member comprising a first end, a second end, and a washer. The first end of the pocket-former can be configured to engage the anchor member. The second end of the pocket-former member can be configured to engage the second end of the bolt member.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION OF THE INVENTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1A:
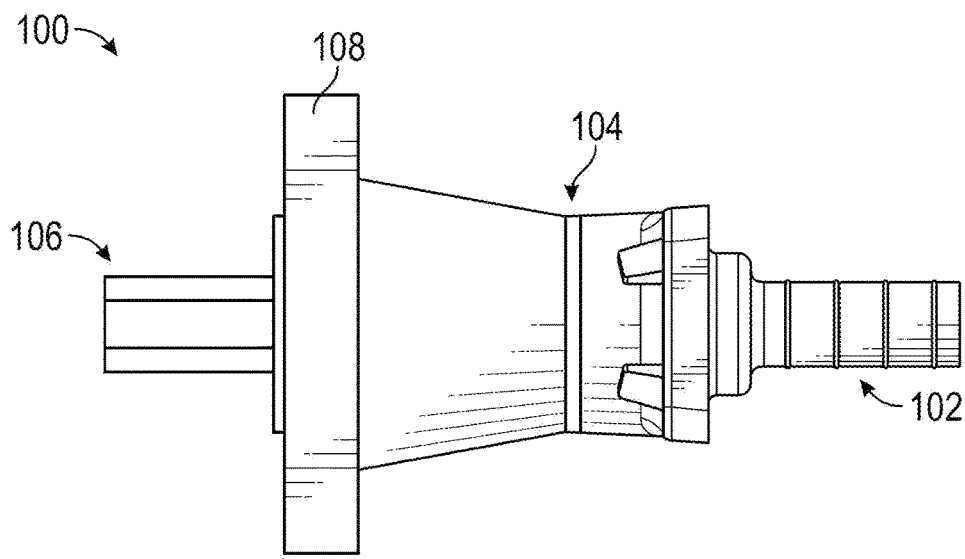
FIG. 1A shows a perspective view of an example of a post-tensioning system or pocket-forming apparatus in accordance with the principles of the present disclosure, wherein an anchor member, pocket-former member, and bolt member can be installed around a form board.
Figure 1B:
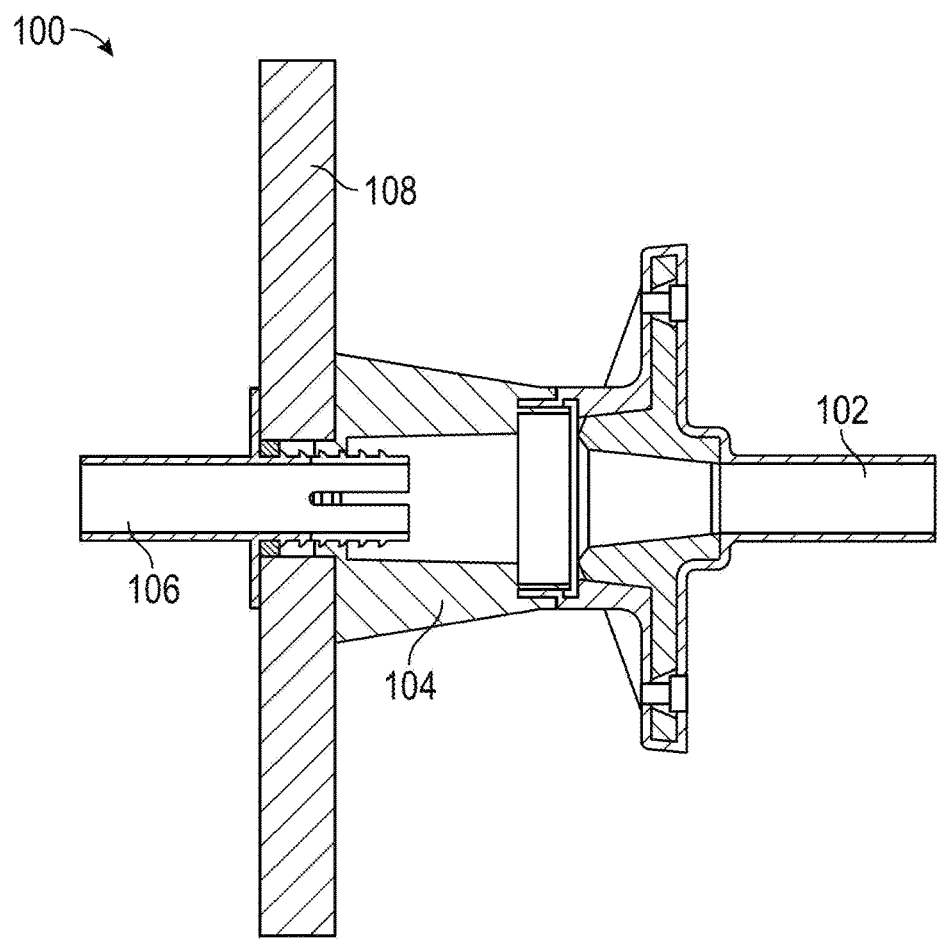
FIG. 1B shows a cross-sectional view of the exemplary post-tensioning system or pocket-former apparatus of FIG. 1A.
Figure 1C:
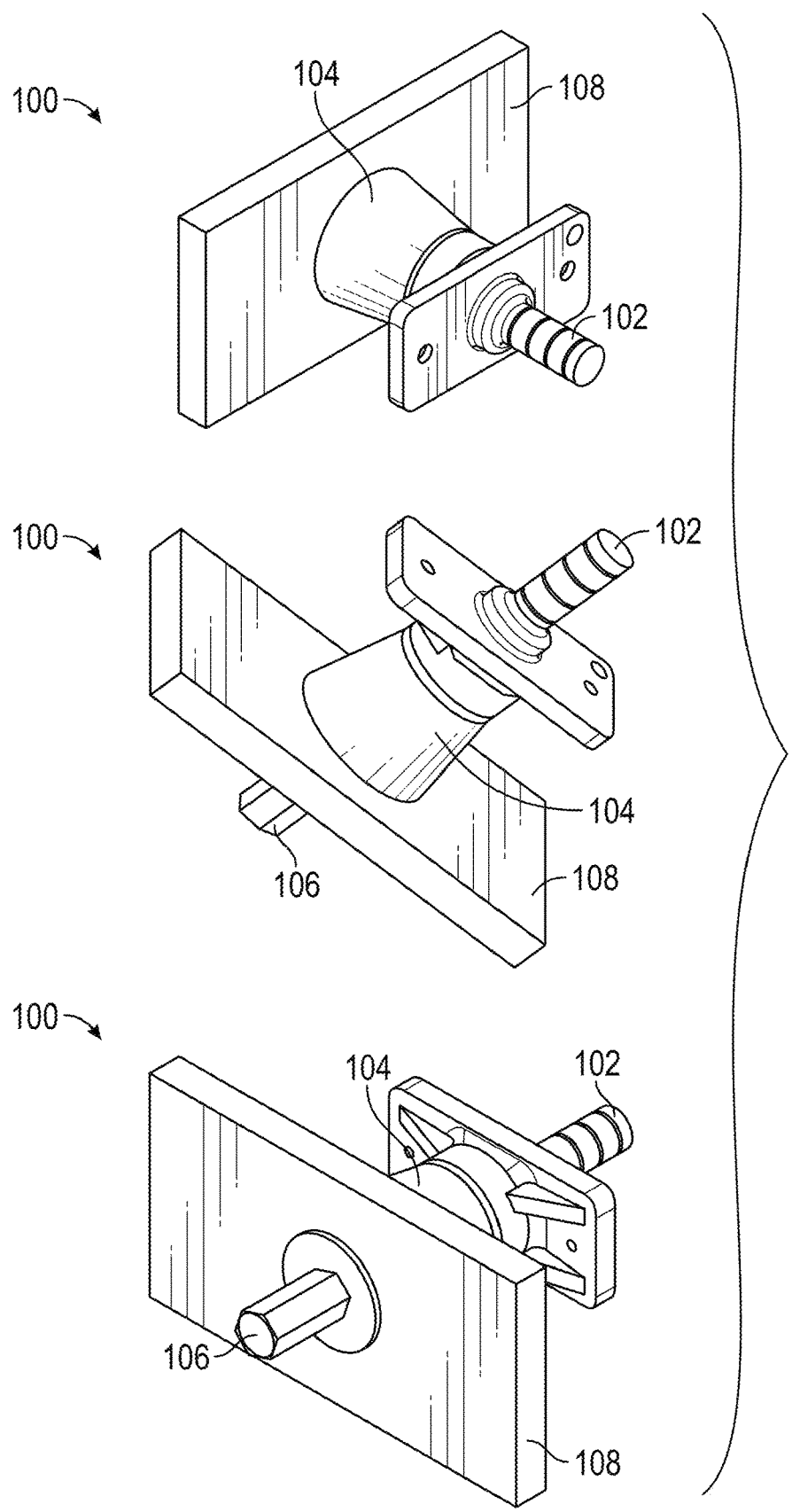
FIG. 1C shows a number of perspective views of the exemplary post-tensioning system or pocket-former apparatus of FIG. 1A.

FIGS. 1A-1C depict an embodiment of the present disclosure. FIG. 1A depicts a perspective view of a post-tensioning system 100 or pocket-former apparatus 100 that can comprise an anchor (anchor member) 102, pocket-former (pocket-former member) 104, a bolt (bolt member) 106, and a cap (cap member) (not shown in FIGS. 1A-1C);

FIG. 1B depicts a cross-sectional view of the system 100 of FIG. 1A, and FIG. 1C depicts perspective views of the system 100. In one embodiment, a form (concrete form) (form board) 108 can be disposed between the pocket-former 104 and the bolt 106. In one embodiment, the anchor 102, pocket-former 104, and bolt 106 can be similar to those known in the art. For example, the anchor 102 can facilitate the tensioning of a tendon within a slab, the pocket-former 104 can enable the creation of a pocket around the anchor such that tendon shears (like those known in the art) can cleave the live end of the tendon, and the bolt can facilitate temporary attachment of the pocket-former 104 to the form 108.

As an example, the system 100 can facilitate the securing of a tendon (not shown) to a form 108. In one embodiment, an anchor 102 can, for example, suspend the tendon between the anchor 102 of the system 100 and another anchor. In another embodiment, the system 100 can be considered the live end of a post-tensioning system. In one embodiment, the anchor 102 can be configured to engage a pocket-former 104, and the pocket-former 104 can then be configured to engage a bolt 106. As shown in FIGS. 1A-1C, the engaging of the pocket-former 104 with both the anchor 102 and the bolt 106 can enable the securing of the system 100 and a tendon extending therethrough to the form 108.

Figure 2A:
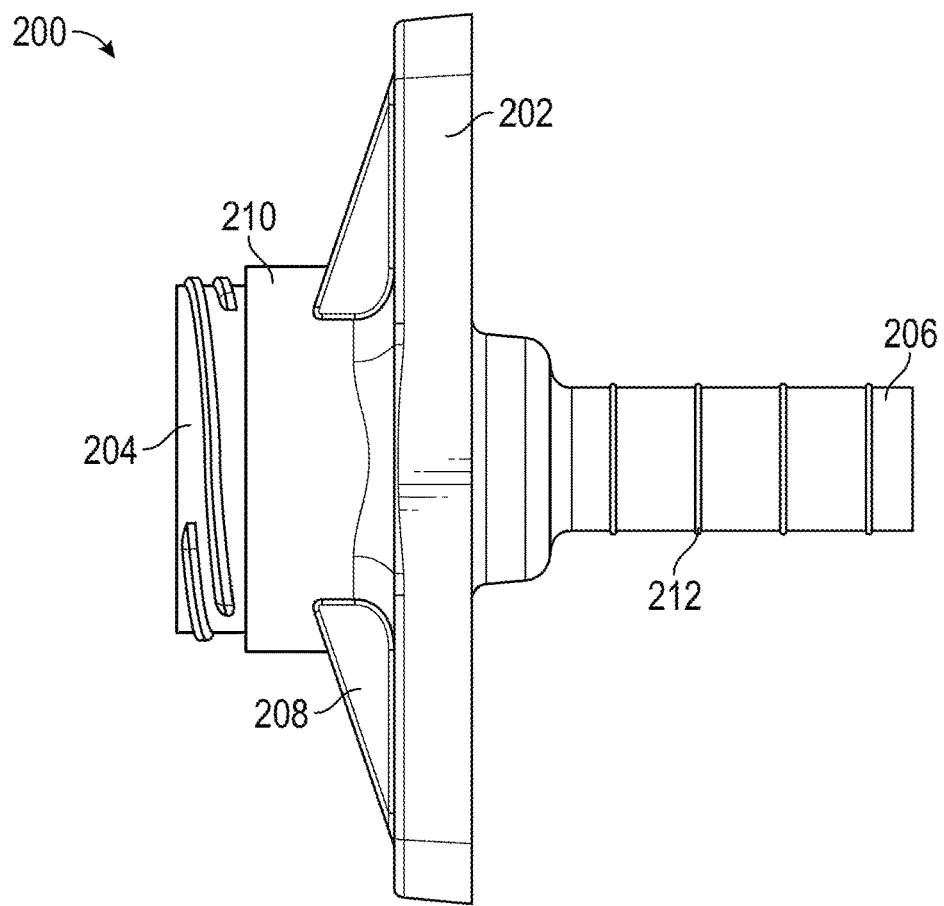
FIG. 2A depicts a perspective view of an exemplary anchor or anchor member comprising a collar accordance with the principles of the present disclosure.
Figure 2B:
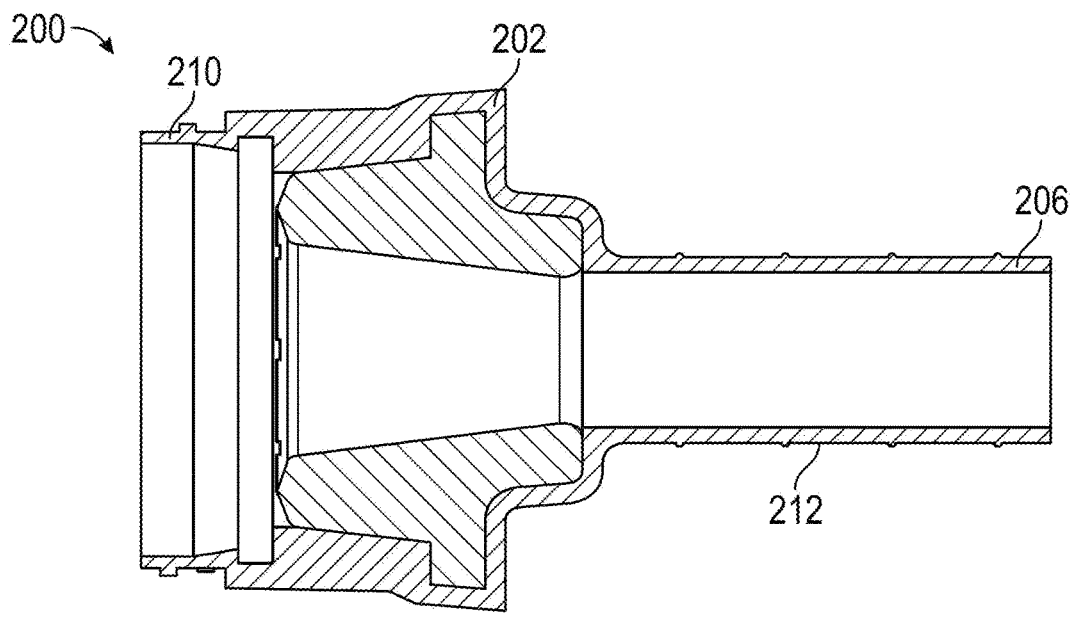
FIG. 2B depicts a cross-sectional view of the exemplary anchor of FIG. 2A.
Figure 2C:
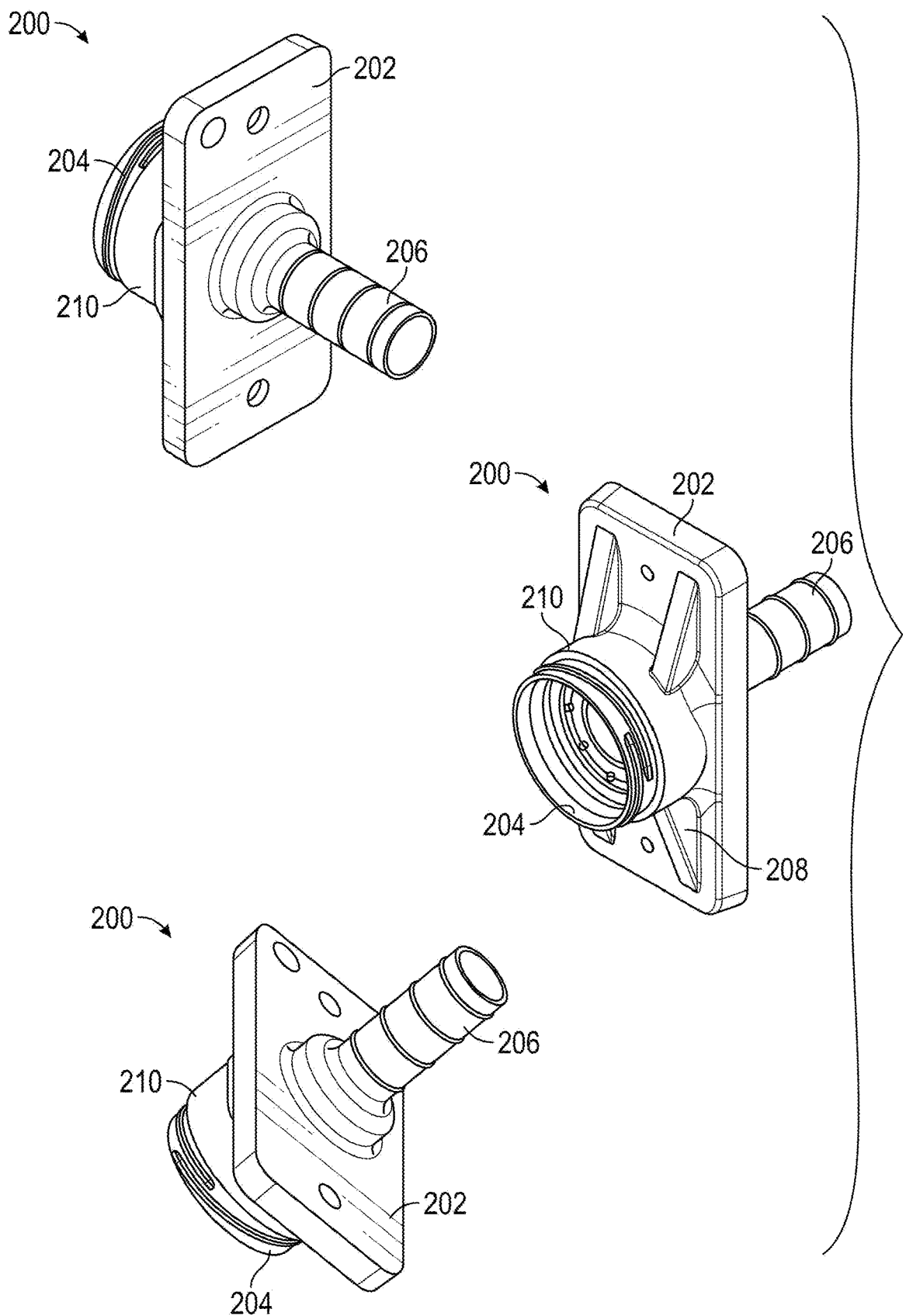
FIG. 2C depicts a number of perspective views of the exemplary anchor of FIG. 2A.

FIGS. 2A-2C depict another embodiment of the present disclosure. An anchor (anchor member) 200 can include a cannular portion 206, a flange 202, a gusset 208, a collar 210, and a first part of a coupling mechanism 204; in one embodiment, the first part of the coupling mechanism can be collar threads 204. In one embodiment, the anchor 200 can be made of iron, steel, titanium, or any other metal or material suitable to facilitate the tensioning of a material that the tending within the anchor 200 is within. In another embodiment, the anchor 200 can be made of metal and encapsulated in a plastic, polymer, or any other material suitable to protect the anchor 200 from corrosion. For example, the anchor 200 can be similar to anchors known in the art, wherein the flange 202 can spread force over a wider area of the slab being tensioned, the gusset 208 can provide support for the flange 202, and the cannular portion 206 can cover a portion of a tendon that is inserted therein and ultimately participate in a bonding or connection, such as via heat shrink in a manner known in the art, or cold shrink, with a sheath of the tendon to protect the tendon from corrosion.

In one embodiment, the anchor 200 can include a coupling mechanism 204 to facilitate coupling of the anchor 200 to another part of a post-tensioning system. For example, the coupling mechanism can be threads (collar threads), a latch, a seal, a clamp, a magnet, a quick-connect, or any other type of mechanism suitable to couple the anchor 200 to a corresponding component. For example, the anchor 200 can include collar threads 204 that correspond to threads on, for example, a pocket-former. Such a mechanism is advantageous, as it enables the anchor 200 to be easily secured to, for example, a form, replacing previous methods of securing an anchor to form via, for example, nails driven through holes in the flange and into the form. In one embodiment, the coupling between the anchor 200 and the corresponding component can be impervious to liquids or slurries, for example, concrete slurry, such that no liquid or slurry can penetrate the connection.

Figure 3A:
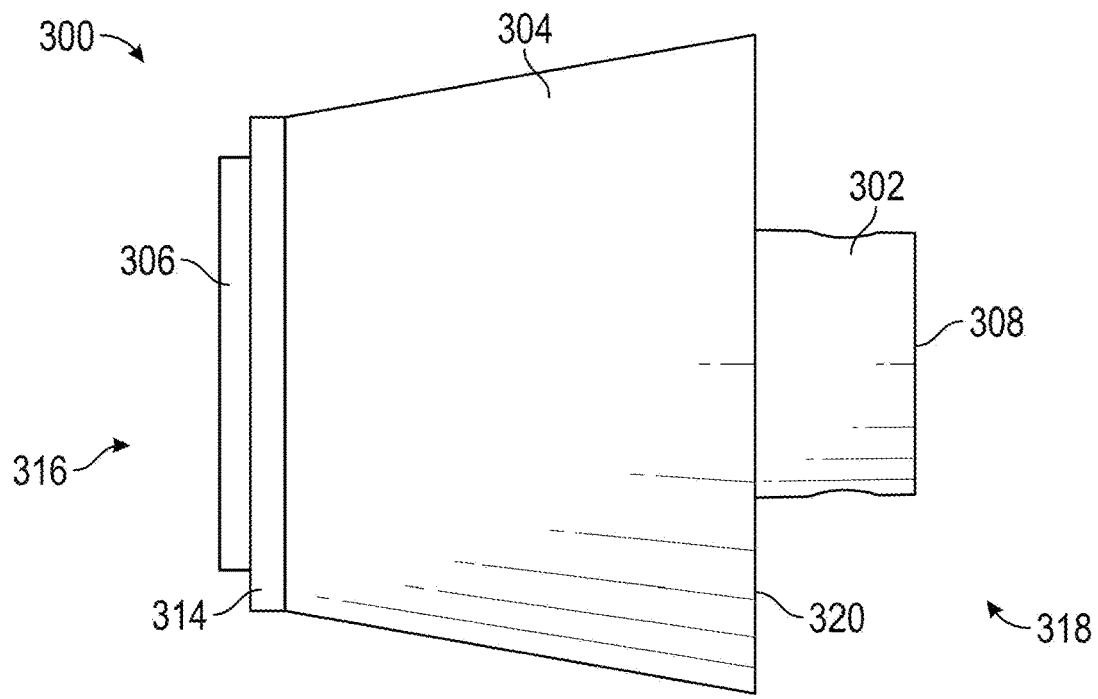
FIG. 3A depicts a perspective view of an exemplary pocket-former comprising a first end and a second end in accordance with the principles of the present disclosure.
Figure 3B:
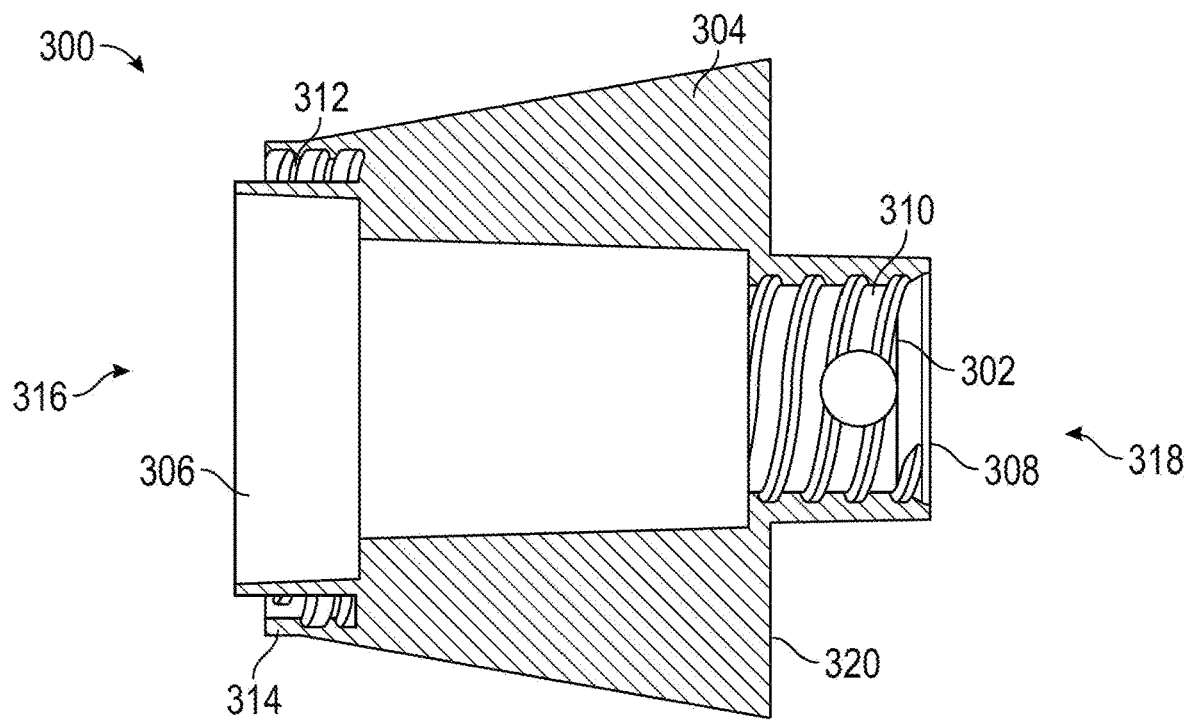
FIG. 3B depicts a cross-sectional view of the exemplary pocket-former of FIG. 3A.
Figure 3C:
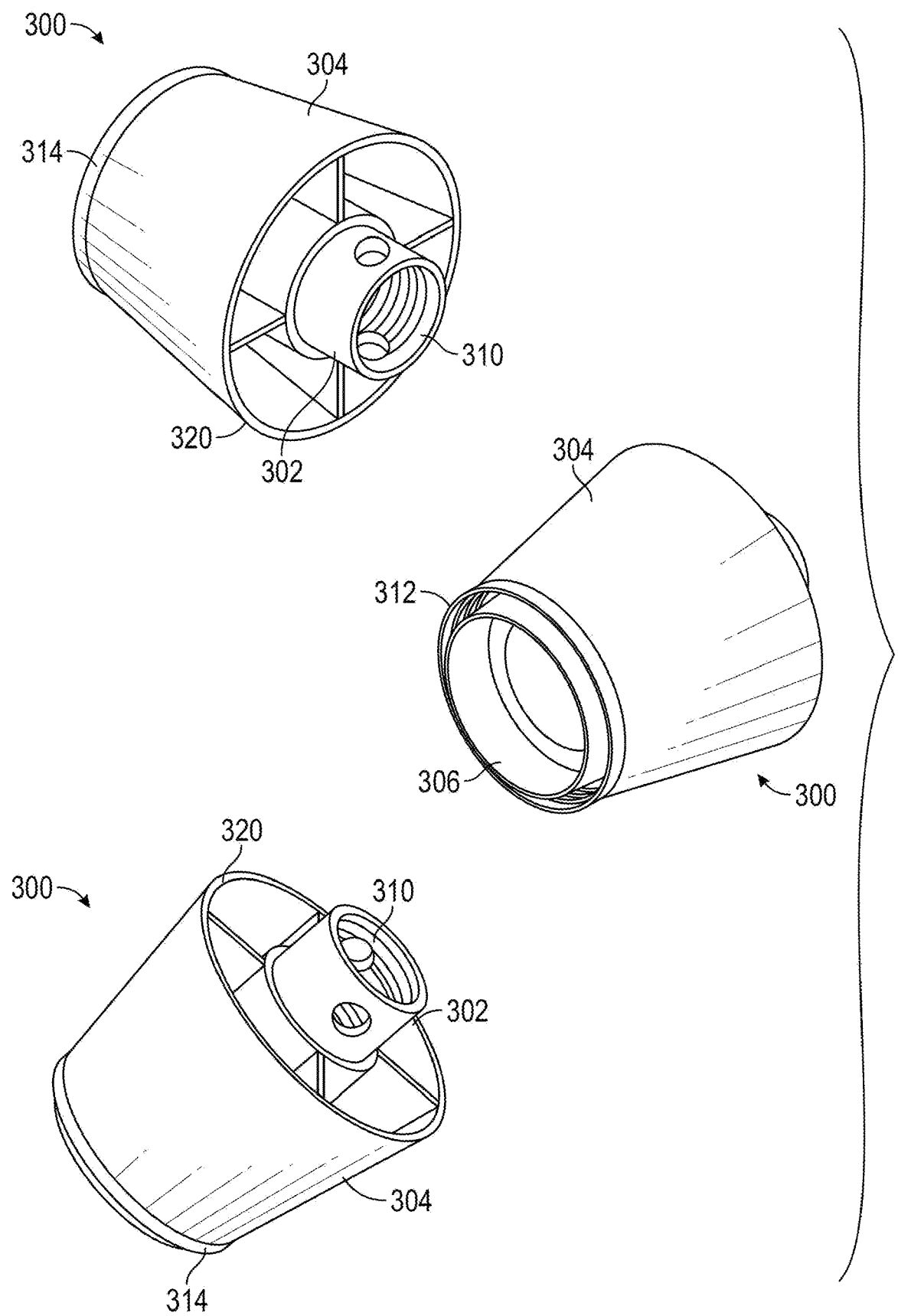
FIG. 3C depicts a number of perspective views of the exemplary pocket-former of FIG. 3A.

FIGS. 3A-3C depict another embodiment of the present disclosure. In one embodiment, a pocket-former (pocket-former member) 300 can include a first end 316 and a second end 318. In another embodiment, the pocket-former 300 can be of any shape, size, or design suitable to create a pocket around an anchor when a slurry is poured; preferably, the pocket created by the pocket-former 300 can be large enough to accommodate a shearing device known in the art, such as the disclosure of U.S. App. No. 63/094,429, which is herein incorporated by reference as an example. For example, a pocket-former 300 can include an inner tube 302 and an outer tube 304. The inner tube 302 can include a first end 306 and a second end 308, and the outer tube 304 can include a first end 314 and a second end 320; in one embodiment, the outer tube 304 can be frustoconical. In one embodiment, the outer tube 304 can be connected to the inner tube 302 as is known in the art; in another embodiment, the outer tube 304 can be connect to the inner tube 302 via brackets, gussets, connectors, welding, or any other way suitable to secure the outer tube 304 to the inner tube 302. In another embodiment, the pocket-former 300 can take the form of a single tube or bulbous shape, tapered or not, frustoconical or not, that can engage an anchor and form a pocket when a slurry is applied. As seen in FIG. 3B, which is a cross-sectional view of the pocket-former 300 depicted in FIG. 3A, the first end 316 of the pocket-former 300 can include a first coupling mechanism 312, such as threads 312; in one embodiment, the first coupling mechanism 312 can be a second part of a coupling mechanism 312 that can correspond to the first part of a coupling mechanism on, for example, an anchor like that discussed with respect to FIGS. 2A-2C. The second end 318 can include a second coupling mechanism 310. The first and second coupling mechanisms 312, 310 can be threads, a latch, a lip, a seal, a clamp, a quick-connect, or any other type of mechanism suitable to couple the pocket-former 300 to a corresponding component. Preferably, the first coupling mechanism 312 can be configured to couple the pocket-former 300 to an anchor, and the second coupling mechanism 310 can be configured to couple the pocket-former 300 to a bolt or form (not shown in FIGS. 3A-3C), such as via a corresponding bolt (not shown in FIGS. 3A-3C). In one embodiment, the first coupling mechanism 312 can include internal threads 312 configured to receive external threads, such as collar threads 204 depicted in FIGS. 2A-2C. In another embodiment, the second coupling mechanism 310 can include internal threads 310 configured to receive external threads, such as the threads 402 depicted in FIGS. 4A-4C.

In one embodiment, the first end 306 and second end 308 of the inner tube 302 can each extend beyond the first end 314 and second end 320 of the outer tube 304, respectively. The first end 306 of the inner tube 302 can, in this manner, form a lip protruding from within the outer tube 304, as seen in FIG. 3A. In one embodiment, the first end 306 of the inner tube 302 can extend into a collar 210 of an anchor 200 like that depicted in FIGS. 2A-2C, and the coupling mechanism (threads) 312 on the interior of the first end 314 of the outer tube 304 can engage with the collar threads 204 of the anchor 200. Such coupling can be seen, for example, in FIG. 1B, wherein the anchor 102 can coupled to the pocket-former 104. In this manner, the pocket-former 300 and anchor can be engaged with one another such that the connection can be impermeable to liquids or slurries, such as to protect the tendon and inside of the anchor from concrete that could interfere with tensioning. In another embodiment, the second end 308 of the inner tube 302 can extend from within the outer tube 304 such that the second end 308 can protrude into, for example, a hole in a form, such as the form 108 seen in FIGS. 1A-1C. Such extension of the second end 308 of the inner tube 302 can enable the second end 320 of the outer tube 320 to abut a form, bracing the pocket-former 300 against the form, while the inner tube 302 can extend into a hole in the form to engage with a bolt (not shown in FIGS. 3A-3C). An example of this extension and placement can be seen in FIG. 1B, wherein the pocket-former 104 can be installed against a form board 108 and secure an anchor 102 thereto via interaction with a bolt 106. The pocket-former 300 can be formed of polymer, plastic, metal, or any other materials suitable to form a pocket when a slurry is applied and secure an anchor to a form.

Figure 4A:
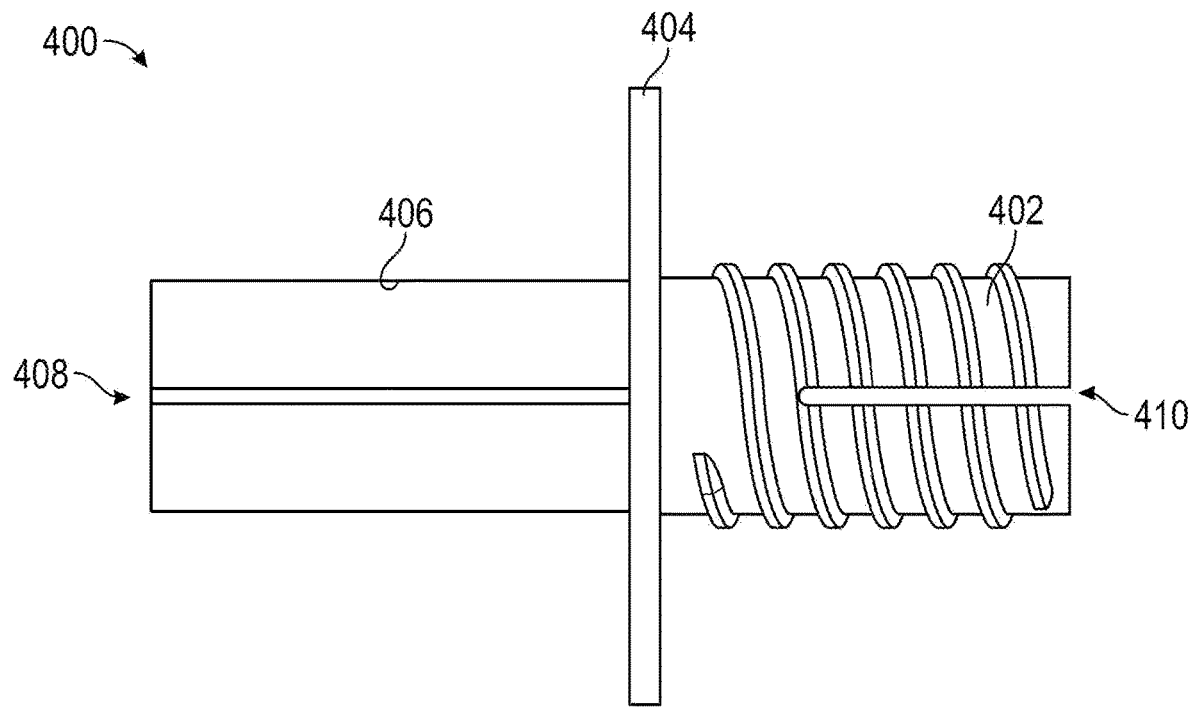
FIG. 4A shows a perspective view of an exemplary bolt or bolt member comprising a first end, second end, and flange in accordance with the principles of the present disclosure.
Figure 4B:
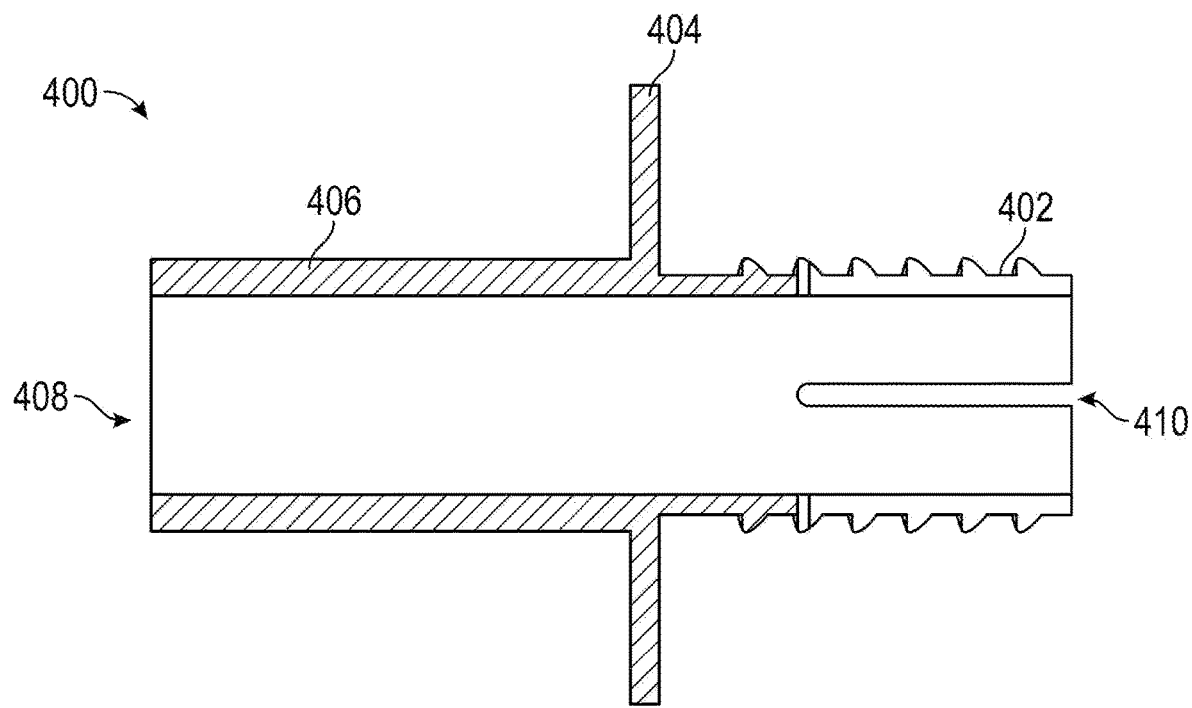
FIG. 4B shows a cross-sectional view of the exemplary bolt of FIG. 4A.
Figure 4C:
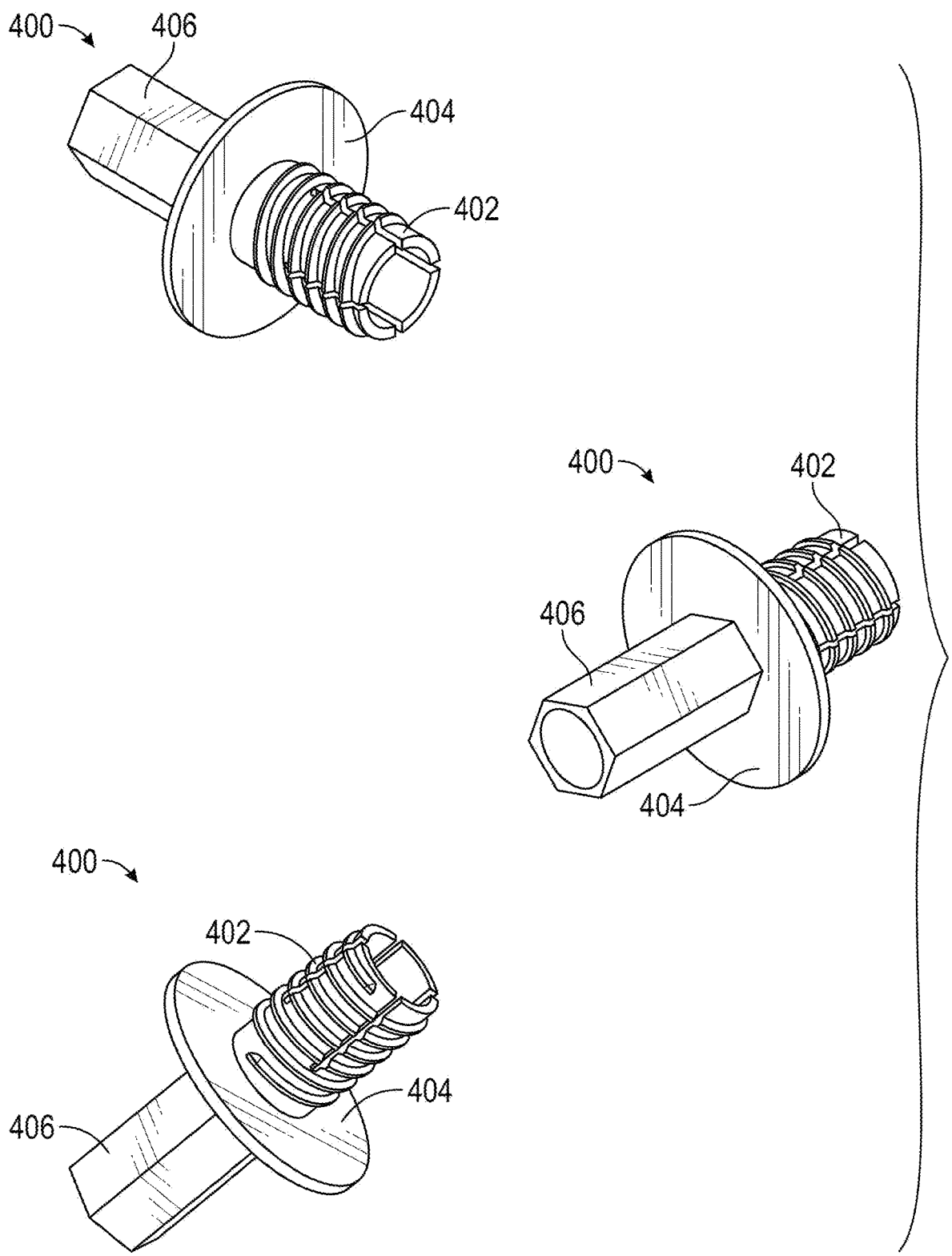
FIG. 4C shows a number of perspective views of the exemplary bolt of FIG. 4A.

FIGS. 4A-4C depict another embodiment of the present disclosure. In one embodiment, a bolt (bolt member) 400 can comprise a first end 408 and a second end 410. For example, the bolt member 400 can take a form of a tube with a first end 408 and a second end 410, with a flange 404 disposed therebetween. In another embodiment, either the first or second end 408, 410 can comprise a coupling mechanism 402. The coupling mechanism 402 can include threads, a lip, a latch, a seal, a clamp, a quick-connect, or any other type of mechanism suitable to couple the bolt 400 to a corresponding component. Preferably, the coupling mechanism 402 can be threads 402. For example, threads 402 can correspond to threads of a pocket-former, such as the pocket-former 300 depicted in FIGS. 3A-3C. In another embodiment, a bolt 400 can comprise a flange 404 or washer 404. The flange 404 can enable the bolt 400 to exert force on a form, such as around a hole in a form through which the second end 410 of the bolt 400 extends, as the second end 410 of the bolt 410 engages, for example, an end of a pocket-former, such as the second end 308 of the inner tube 302 depicted in FIGS. 3A-3C. In one embodiment, the bolt 400 can be hollow, such as to receive a tail of a tendon. In another embodiment, the bolt 400 can comprise a head 406 and a connector 402. The head 406 can include a hilt, shaft, nut, cap, ring, or any other component suitable to facilitate the application of torque to the bolt 400. The head 406 can be of any suitable size or shape to allow the bolt 400 to be tightened by hand, or otherwise engage with a tool; for example, the head 406 can be configured as any standard wrench head. In one embodiment, the head 406 can be an extended hexagonal tube, such as to allow the engaging of a wrench or a human hand with the head 406 to tighten the bolt 400. In one embodiment, the head 406 can be enclosed, such that, for example, a tail of a tendon cannot extend beyond the head 406; in another embodiment, the head 406 can be open, such as to allow a tendon tail to extend therethrough. In one embodiment, the head 406 or first end 408 can take the form of a tube 406, such that a tail of a tendon can extend therethrough. In one embodiment, the connector 402 can include threads, a latch, a lip, a seal, a clamp, a quick-connect, or any other type of mechanism suitable to couple the bolt 400 to a corresponding component; in another embodiment, the connector 402 can include threads 402, such as threads that can correspond to threads in, for example, an end of a pocket-former such as a pocket-former discussed herein. In another embodiment, the connector 402 can be hollow, such as to allow a tendon to extend therethrough. The bolt 400 can be formed of polymer, plastic, metal, or any other materials suitable to secure a pocket-former and/or an anchor to a form.

Figure 5A:
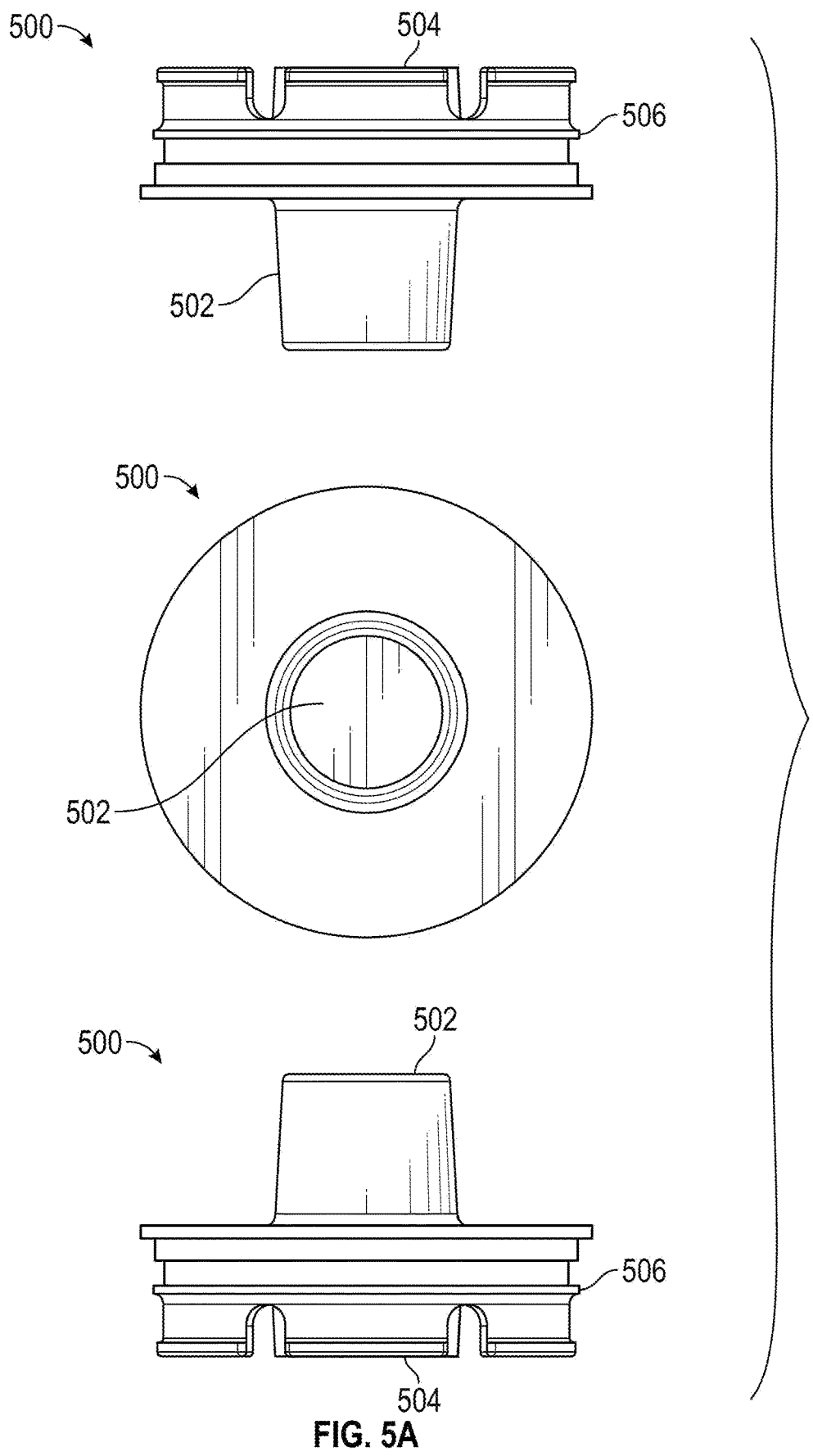
FIG. 5A shows a number of perspective views of an exemplary cap or cap member comprising a top side, bottom side, and a sealer member in accordance with the principles of the present disclosure.
Figure 5B:
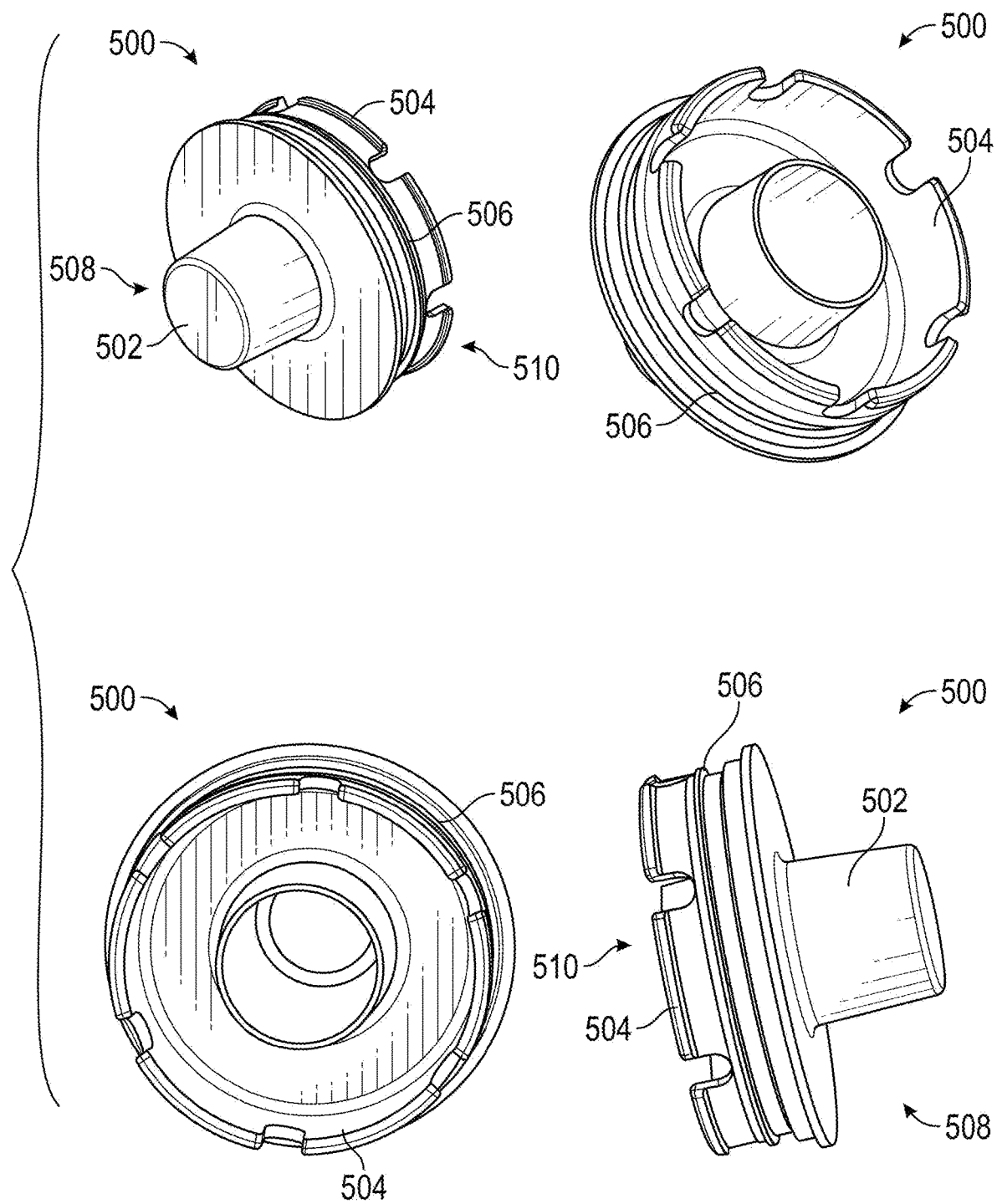
FIG. 5B shows a number of perspective views of an exemplary cap or cap member comprising a top side, bottom side, and a sealer member in accordance with the principles of the present disclosure.

FIGS. 5A-5B depict another embodiment of the present disclosure. A cap (cap member) 500 can include a top side 508 and a bottom side 510. In one embodiment, the top side 508 can include a nodule 502 that protrudes from the top side 508. The nodule 502 can be of any length, depth, or size to enable the cap 500 to be gripped; in another embodiment, the nodule 502 can be of any length, depth, or size to receive a tail of a tendon, such as a tail of a tendon that has been sheared. In one embodiment, the bottom side 510 can include a rim 504; in another embodiment, the rim 504 can include arches or other pores to, for example, allow air to escape as the cap 500 is engaged with, for example, an anchor collar, or to facilitate the capping of an anchor. In another embodiment, the cap 500 can include a sealing member 506. For example, the sealing member 506 can include an O-ring 506; in another example, the sealing member 506 can comprise wax, adhesive, plastic, rubber, or any other component or material suitable to create a seal between the cap member 500 and the component it is capping. For example, the cap member 500 can include an O-ring 506 that can create a seal between the cap 500 and a collar of an anchor, such as the collar 210 of the anchor 200 depicted in FIGS. 1A-1C.

Figure 6:
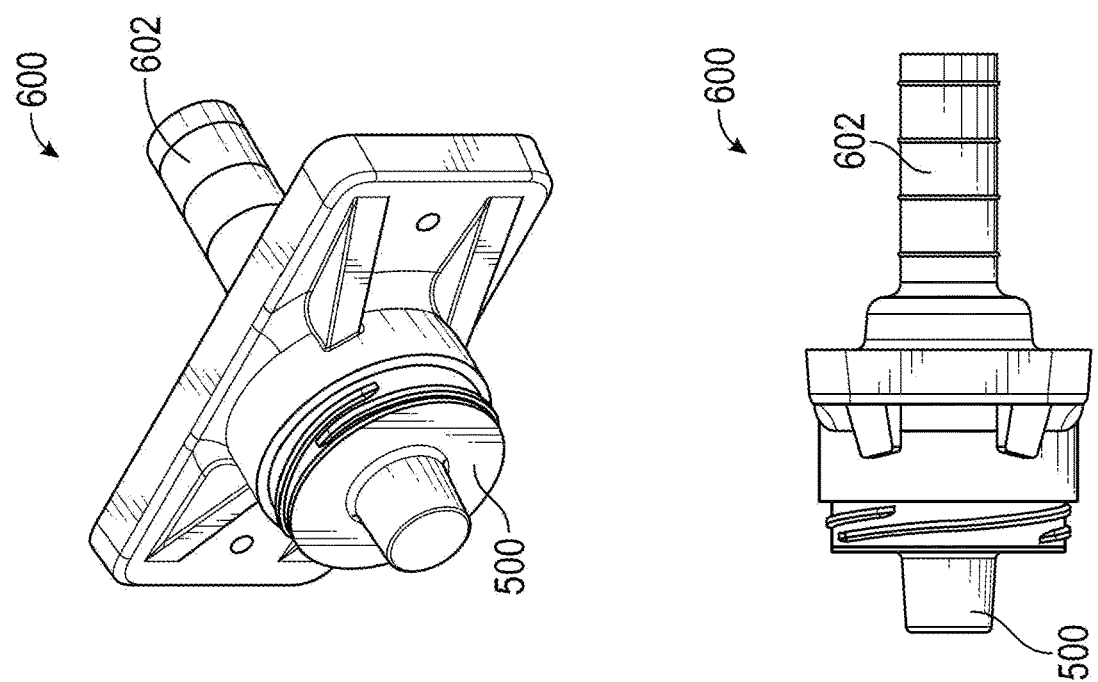
FIG. 6 depicts a number of perspective views of an exemplary post-tensioning system in accordance with the principles of the present disclosure, wherein the system can comprise an anchor and a cap coupled to the anchor.
Figure 6:
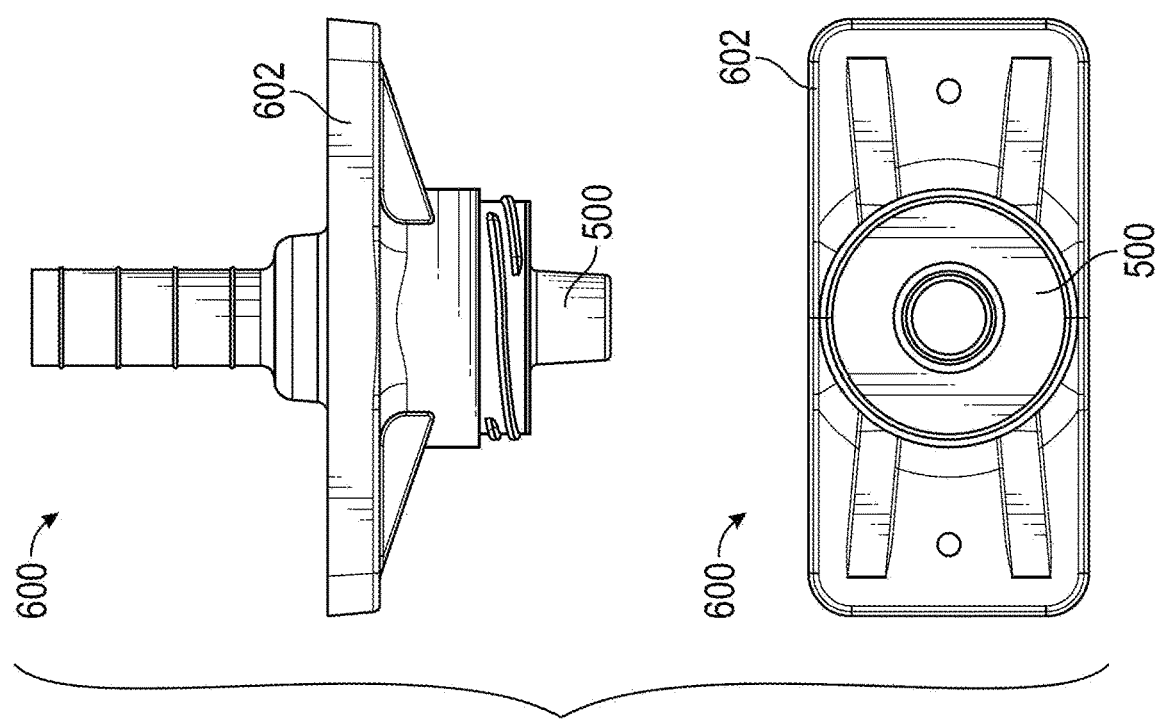
Figure 7A:
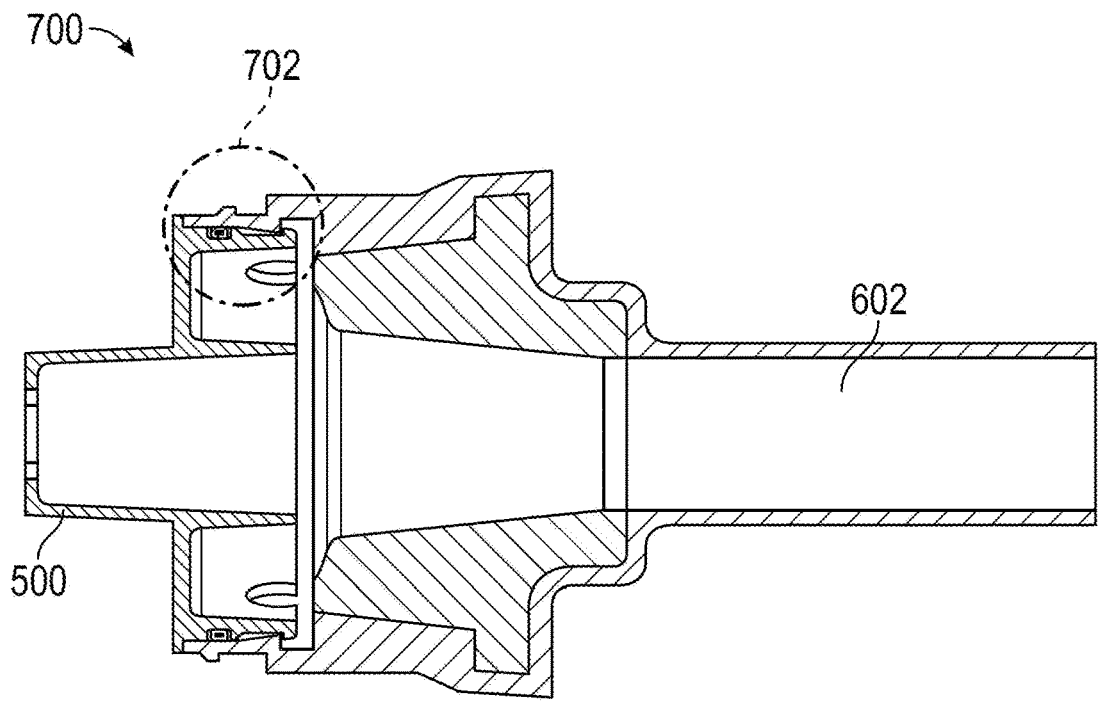
FIG. 7A depicts a cross-section view of an exemplary post-tensioning system similar to the post-tensioning system of FIG. 6.
Figure 7B:
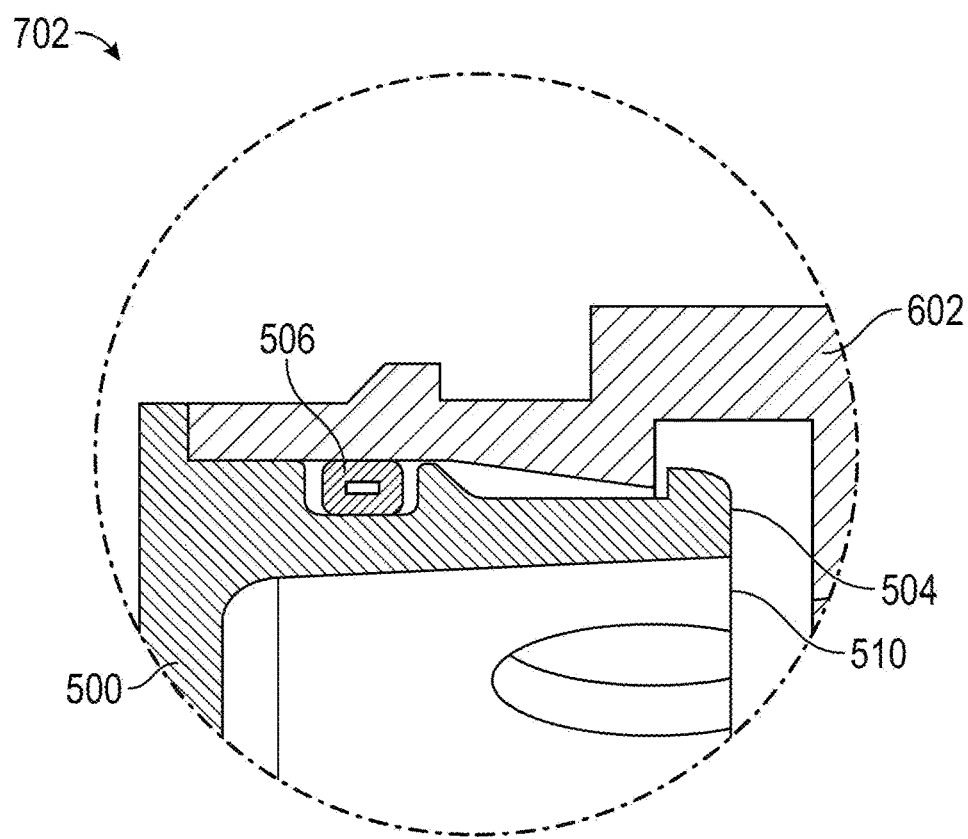
FIG. 7B depicts the exemplary post-tensioning system of FIG. 7A, wherein a seal is depicted between a cap and an anchor that can be facilitated by the sealer member.

FIG. 6 depicts another embodiment of the present disclosure. A post-tensioning system 600 can include an anchor (anchor member) 602 and a cap (cap member) 500 as depicted in FIGS. 5A-5B. The cap 500 can be used to enclose a sheared tendon within an anchor after tensioning as occurred. For example, when a slab has been tensioned, the tendon tail can be cleaved within the pocket formed by a pocket-former. The tendon end, and the inside of the anchor 602, can then be exposed to the elements, which can lead to corrosion of the tendon and the anchor 602. To mitigate or prevent corrosion, a cap 500 can be engaged with the anchor 602, effectively protecting the tendon tail and inside of the anchor from such corrosion. The cap 500 can be made from plastic, polymer, glass, metal, or any other material suitable to cap an anchor and mitigate or prevent corrosion of the system 600. For example, FIGS. 7A-7B depict another embodiment of the present disclosure, wherein a post-tensioning system 700 includes a cap 500 and an anchor 602. The cap 500 can create a seal with the anchor 602, such as at the area depicted at 702. For example, the sealing member 506 can be an O-ring 506 that can create a seal with the anchor 602, while the bottom side 510 (and/or the rim 504) can facilitate securing of the cap 500 within the anchor, such as via a lip of the rim 504 engaging the anchor 602 as seen in FIG. 7B.

Figure 8A:
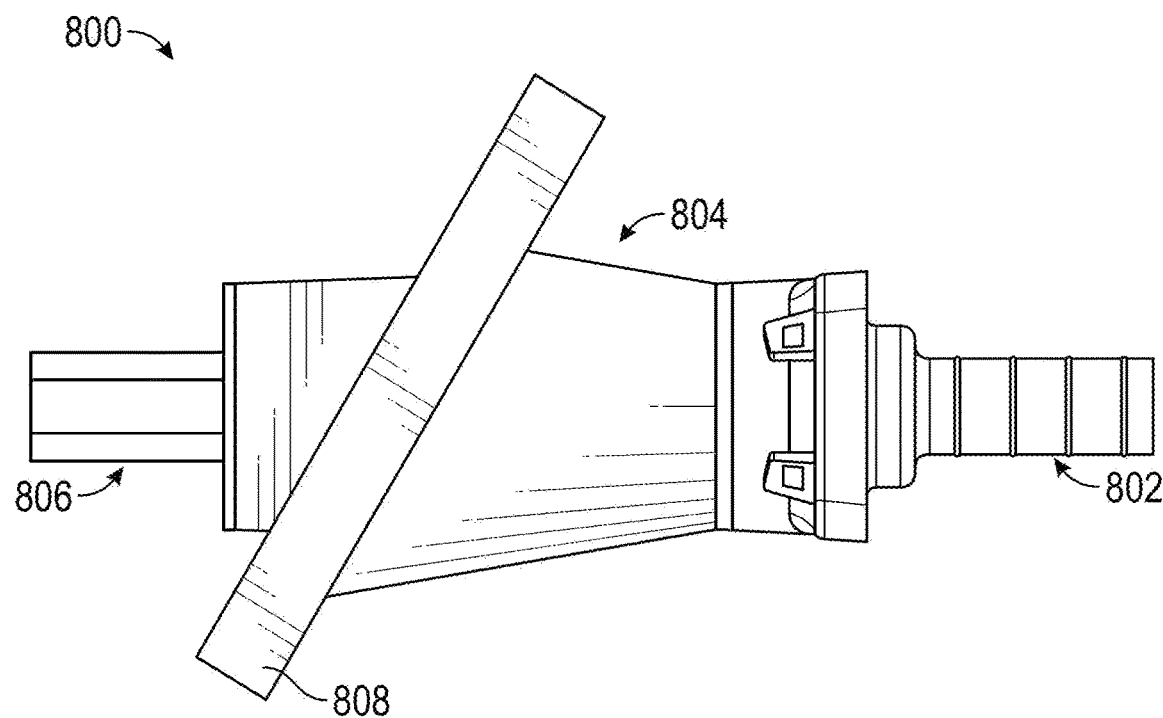
FIG. 8A shows an exemplary post-tensioning system in accordance with the principles of the present disclosure, wherein the system can comprise an anchor, a pocket-former, a bolt, a washer, and can be further configured to be secured to a form, for example, to an angled form.
Figure 8B:
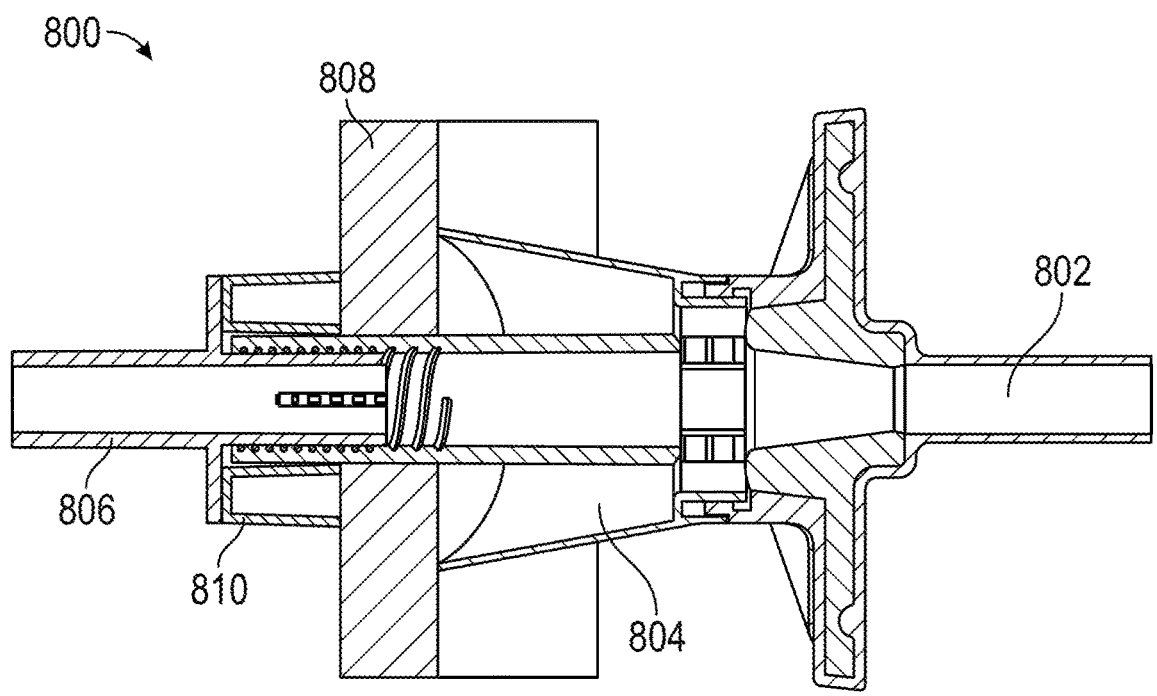
FIG. 8B shows a cross-sectional view of the exemplary post-tensioning system of FIG. 8A.
Figure 8C:
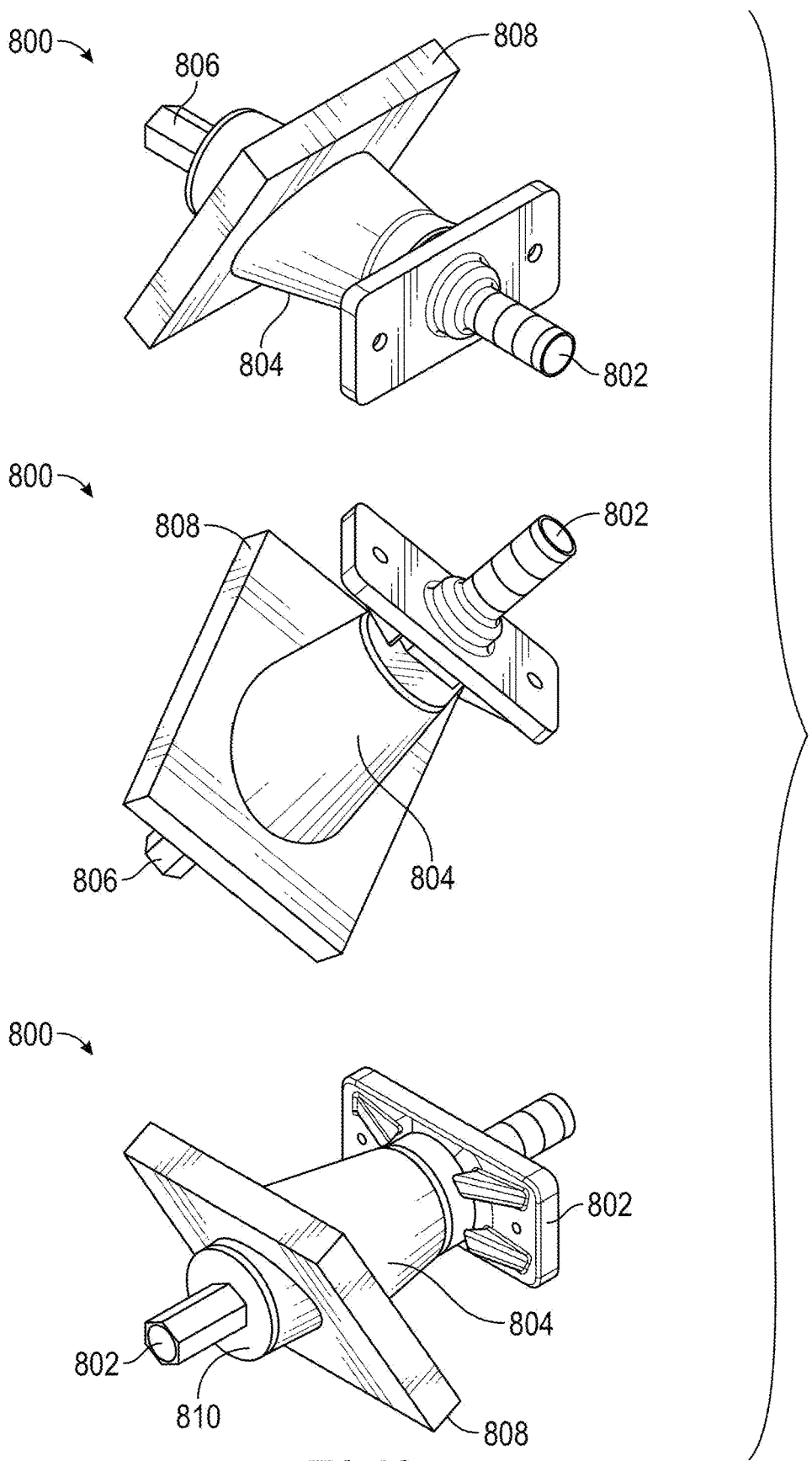
FIG. 8C depicts a number of perspective views of the exemplary post-tensioning system of FIG. 8A.

FIGS. 8A-8C depict another embodiment of the present disclosure. A pocket-former apparatus 800 or post-tensioning system 800 can be similar to the system and apparatus of FIGS. 1A-1C and can be configured to accommodate and tension a slab, for example, a slab at an angle. For example, a form 808 can provide shape to a slab, and a pocket-former 804 can be configured to be seated against the form 808, such as via an angle of an outer tube of the pocket-former 804. Similarly, the bolt member 806 can be configured to be seated against the form 808; for example, a flange 810 or washer 810 of the bolt member 806 can be angled to correspond to the angle of the form 808.

Figure 9A:
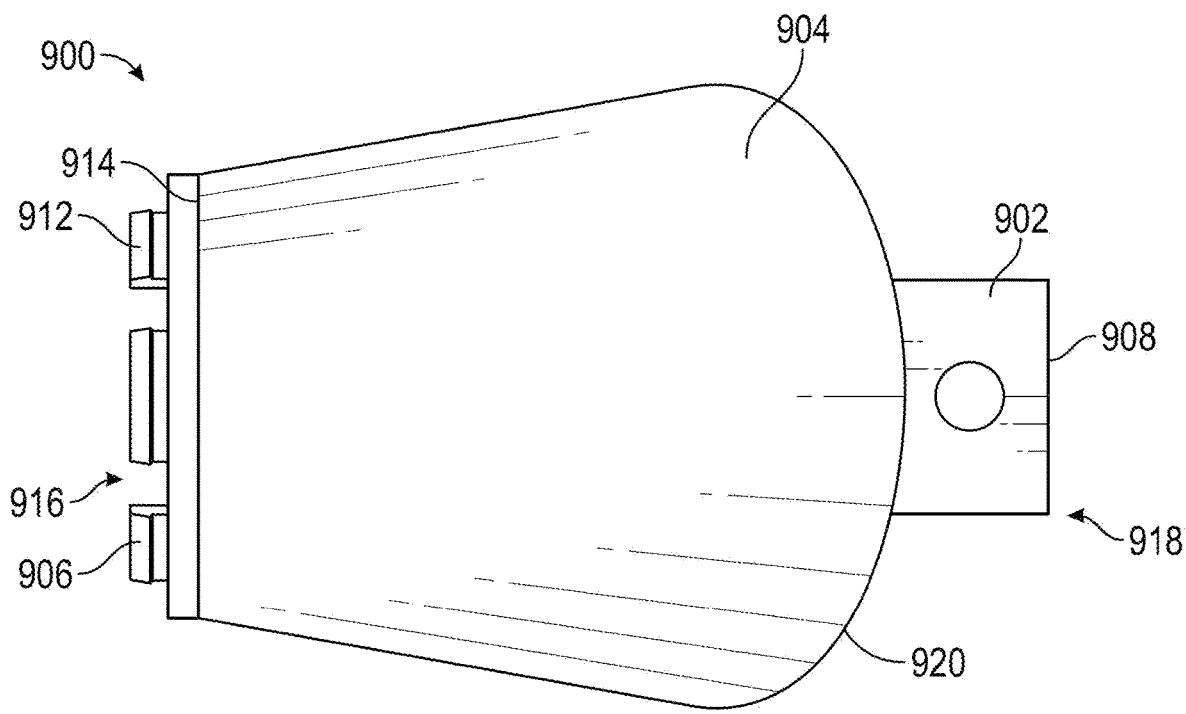
FIG. 9A depicts an exemplary pocket-former comprising a first end, second end, and at least one coupling mechanism in accordance with the principles of the present disclosure.
Figure 9B:
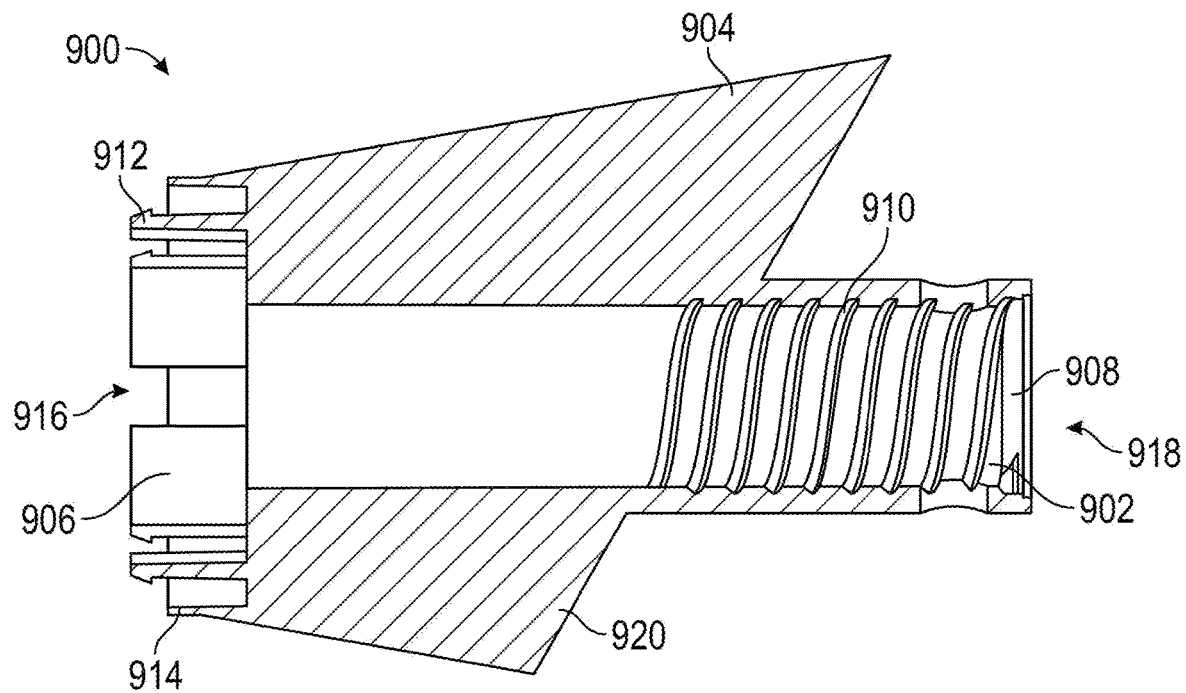
FIG. 9B depicts a cross-sectional view of the exemplary pocket-former of FIG. 9A.
Figure 9C:
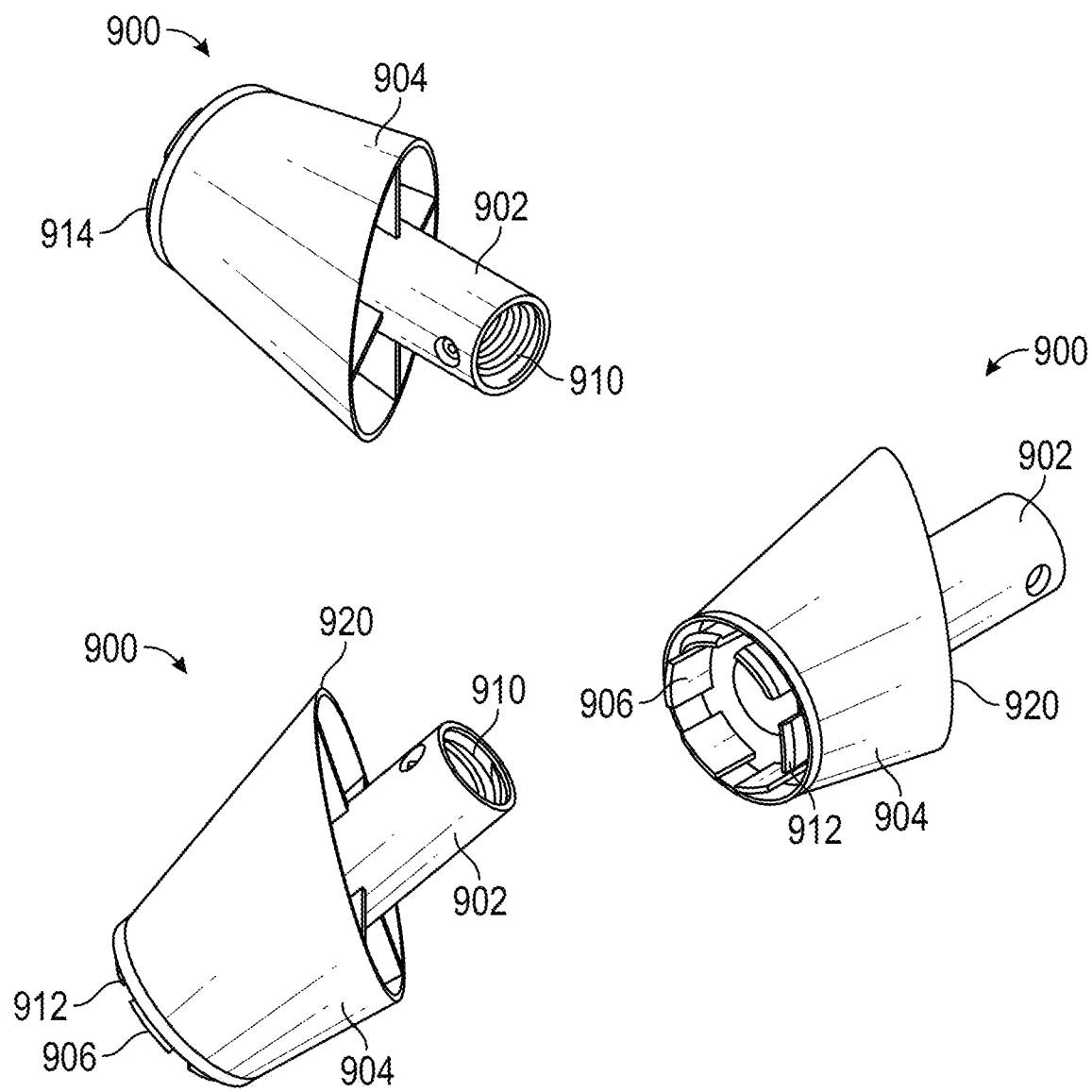
FIG. 9C depicts a number of perspective views of the exemplary pocket-former of FIG. 9A.

FIGS. 9A-9C depict another embodiment of the present disclosure. A pocket-former (pocket-former member) 900 can be similar to the pocket-former 300 of FIGS. 3A-3C. The pocket-former 900 can include a first end 916 and a second end 918, and can be of any suitable size, shape, or design to enable the pocket-former 900 to engage an anchor and form a pocket when a slurry is applied. In one embodiment, the first end 916 of the pocket-former 900 can include a first coupling mechanism 312; in another embodiment, the second end 918 of the pocket-former 900 can include a second coupling mechanism 910. The first and second coupling mechanisms 912, 910 can comprise threads, a latch, a lip, a seal, a clamp, a quick-connect, or any other type of mechanism suitable to couple the pocket-former 900 to a corresponding component. Preferably, the first coupling mechanism 912 can be configured to engage with and couple the pocket-former 900 to an anchor, such as an anchor discussed herein. For example, the first coupling mechanism 912 can include a rim 912 sized to fit, for example, within a collar of an anchor. The rim 912 can further comprise a beveled lip 912 configured to allow one-way insertion into the collar, such that the beveling enables the rim 912 to insert into the collar while hindering the removal of the rim 912 from within the collar. In this manner, the first end 916 of the pocket-former 900 can be configured to couple with or engage with a collar of an anchor. Preferably, the second coupling mechanism 910 can be configured to couple or engage with a bolt or bolt member, such as those discussed herein. For example, the second coupling mechanism 910 can include threads 910 configured to engage with corresponding threads on a bolt member, such as the threads 402 discussed with respect to the bolt 400 depicted in FIGS. 4A-4C

In one embodiment, a pocket-former 900 can include an inner tube 902 and an outer tube 904. The inner tube 902 can include a first end 906 and a second end 908, and the outer tube can include a first end 914 and a second end 920. In one embodiment, the first 914 or second end 920 of the outer tube 904 can be angled, such as to conform to an angled form such as can be seen in FIGS. 8A-8C. In another embodiment, the first end 906 or second 908 end (or both) of the inner tube 902 can extend beyond the first 914 and/or second 920 end of the outer tube 904, respectively. In another embodiment, a first coupling mechanism 912 can be disposed or present on the first end 906 of the inner tube 902; for example, the first end 906 of the inner tube 902 can comprise a rim 912 with a beveled lip 912 such as that discussed above. Further, there can be a space between the first end 906 of the inner tube 902 and the first end 914 of the outer tube 904 can, such that at least a portion of a collar of an anchor can engage within the space; in this manner, for example, the first end 916 of the pocket-former 900 can be configured to engage with or couple with a collar of an anchor. In another embodiment, a second end 908 of the inner tube 902 can comprise a second coupling mechanism 910; for example, the second coupling mechanism 910 can include threads 910 on the inside of the inner tube 910 that can correspond to threads of, for example, a bolt of bolt member like those discussed herein. In this manner, for example, the second end 918 of the pocket-former 900 can be configured to engage or couple with a bolt or bolt member.

Figure 10A:
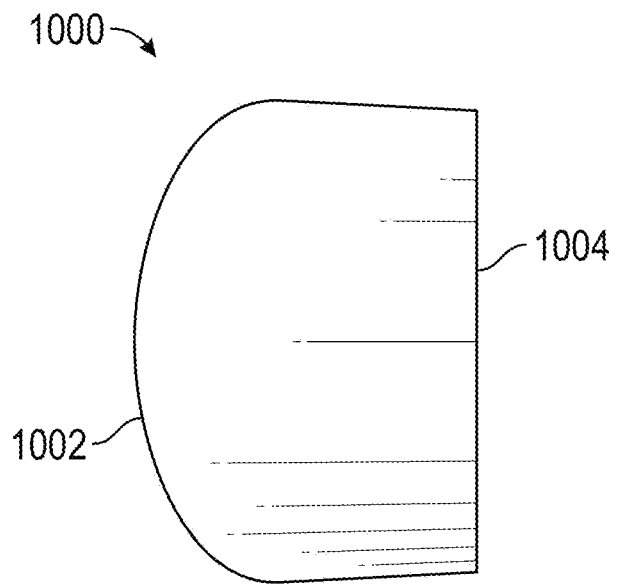
FIG. 10A depicts an exemplary washer comprising a first and second end in accordance with the principles of the present disclosure.
Figure 10B:
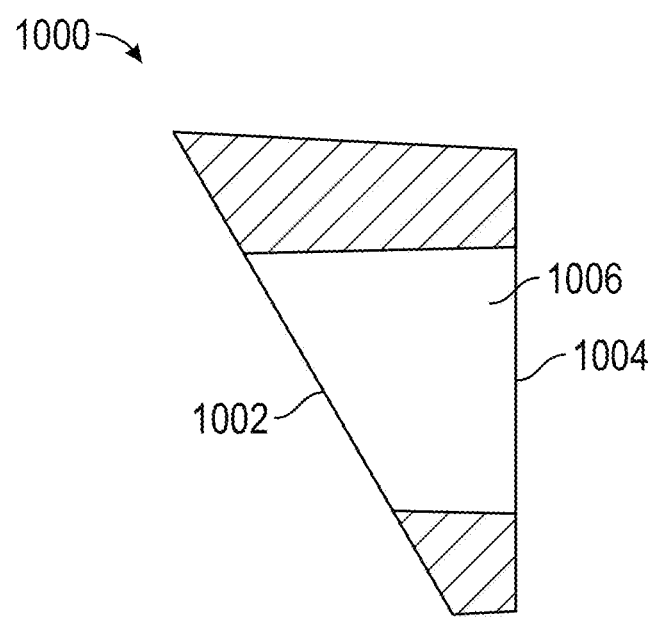
FIG. 10B depicts a cross-sectional view of the exemplary washer of FIG. 10A.
Figure 10C:
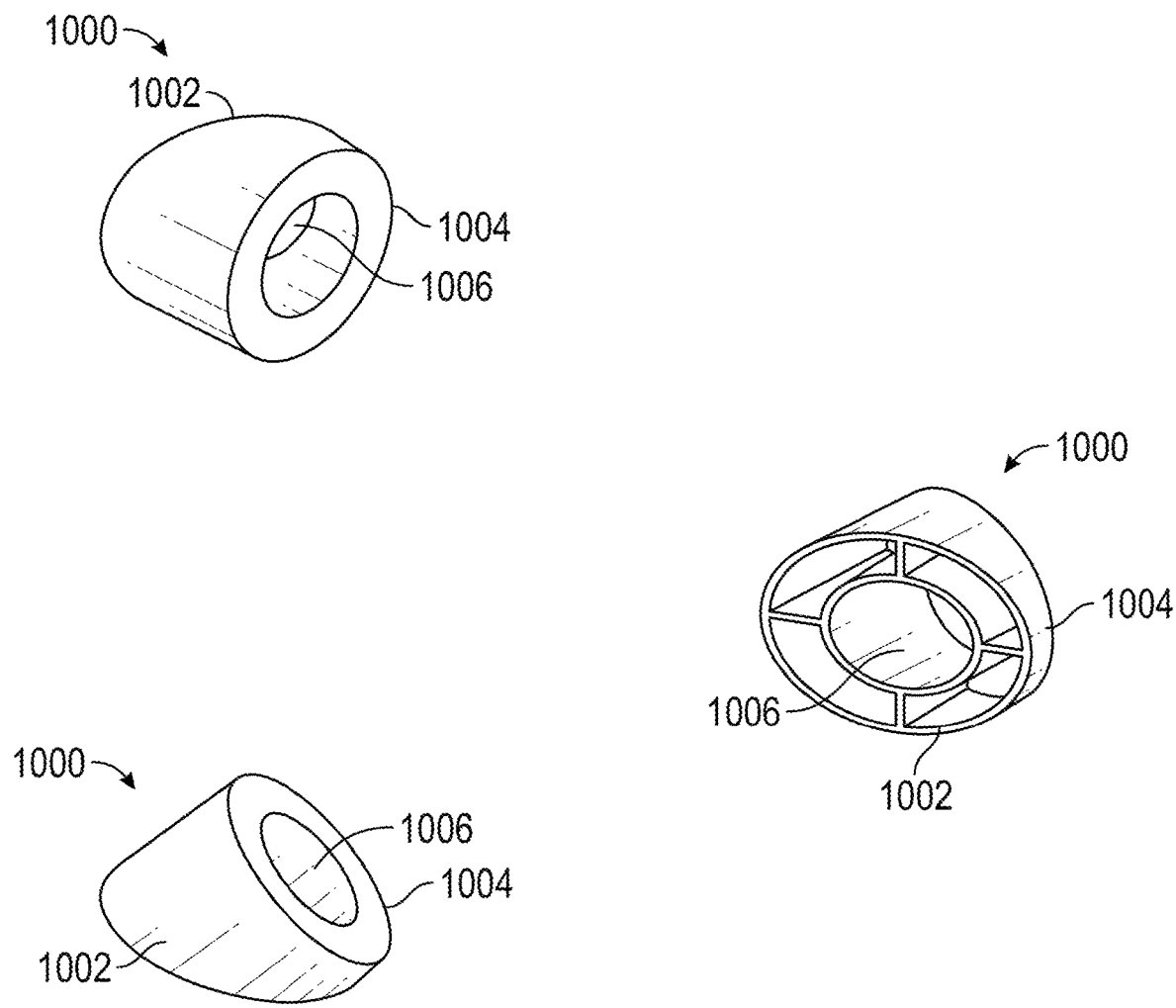
FIG. 10C depicts a number of perspective view of the exemplary wash of FIG. 10A.

FIGS. 10A-10C depict another embodiment of the present disclosure. A washer (washer member) 1000 can include a first side 1002 and a second side 1004. The washer 1000 can comprise a ring configured to engage or encircle a bolt or bolt member like those discussed herein, such as the washer 810 that can be seen in FIGS. 8A-8C. In one embodiment, the first side 1002 or the second side 1004 can be angled, such as the first side 1002 in FIG. 10B, such that the washer can abut an angled form board, such as washer 810 in FIGS. 8A-8C; in another embodiment, the sides 1002, 1004 can run parallel with one another, and the washer 1000 can be a flat circle or ring, such as to conform to a non-angled form. In one embodiment, the washer 810 can further comprise a cavity 1006 extending therethrough; in this manner, for example, the washer 810 can be configured to receive a bolt or bolt member, such as those discussed herein. Preferably, the washer 810 can be inserted over a bolt 806 and, for example, abut a flange of a bolt or restrict a bolt from traveling further through the cavity 1006, such that the bolt can then apply force at an angle commensurate with the form board angle, as seen in FIGS. 8A-8C. In another embodiment, a flange 810 can be disposed on a bolt, such as the bolt 400 depicted in FIGS. 4A-4C, such that the flange 404 can take the form of the flange 810.

The systems and members discussed herein can be configured to engage with one another in a system, such as system 100 and 800. For example, an anchor can comprise a coupling mechanism to facilitate coupling to a pocket-former, as discussed herein. It will be understood by those in the art that a coupling mechanism can be divided between two components for example, a coupling mechanism that comprises threads located on two different components can enable those components to couple with one another. The two sets of threads can be considered two separate parts of the same coupling mechanism. For example, a member can comprise a first part of a two-part coupling mechanism (for example, threads, a rim with a beveled lip, a part of a quick connect, a latch, or any other suitable part of a mechanical coupling mechanism), and another member can comprise a second part of a two-part coupling mechanism (for example, threads, a receiving rim for a rim with a beveled lip, another part of a quick connect, a keeper for a latch, or any other suitable part of a mechanical coupling mechanism that can corresponding to the first part of the coupling mechanism). In another embodiment, one component can comprise a coupling mechanism that is one-sided, for example, a rim with a beveled lip that can insert into a cavity of an anchor collar to facilitate coupling. In another embodiment, components herein can be configured to engage one another through any collection of mechanisms or designs such as those discussed herein. A pocket-former can be configured to engage with an anchor via threads or other coupling mechanism; by comprising an inner tube and an outer tube that creates a space therebetween that can receive a portion of a collar of an anchor; or by some other means of engagement known in the art or described herein. A pocket-former can similarly be configured to engage with a bolt, or a bolt with a pocket-former. In another embodiment, the members discussed herein can be designed such that coupling can be accomplished via tapering of a given area to facilitate insertion of the tapered area into a receiving area. For example, an anchor collar like one discussed herein can have a tapered end, such that the collar can insert into an end of a pocket-former member.

The present disclosure offers several advantages in the art. A pocket-former such as those discussed herein can be designed to fit on the outside of a collar of an anchor to form a seal or gasket via the shape, fitment, or design of the pocket-former and/or anchor or anchor collar. The pocket-former can have a receiving helical threaded member on the interior of the tubular section (such as 310 depicted in FIGS. 3A-3C), and such tubular section and corresponding helices can be either straight or tapered; this can enable the pocket-former to positively retain to the form board via the threaded fastener (bolt or bolt member) turned either clockwise or counterclockwise direction. In one embodiment, pressure exerted between the bolt and pocket-former (such as via a flange of the bolt) can sandwich the form board therebetween, retaining the pocket-former against the form; in another embodiment, engaging the bolt with the pocket-former can cause a slight elastic deformation or expansion, causing a hole in the form to be filled with the pocket-former and inserted bolt. In one embodiment, such mechanisms described above can positively connect an anchor with an angular ridge (for example, as seen at 204 and 210 in FIGS. 2A-2C) fitted to the collar of the encapsulated anchor with a mechanical connection. The encapsulated anchor can include a bare anchor over-molded with a plastic and a sheathed or unsheathed tendon in place before the concrete is poured.

Accordingly, and in one embodiment, via the interior receiving helical threaded member of the pocket-former discussed above, the adhesion of concrete slag to, e.g., collar threads or threads of a bolt can be prevented—such adhesion would otherwise not allow the pocket-former to secure properly to the form board. The interior helical threads can also allow for a faster assembly time by reducing the amount of turns needed to secure the system—in one embodiment, only two full turns can be needed to fully secure the pocket-former to an anchor or bolt, effectively connecting the opposing members together and forming a nail-less pocket-former assembly 100, 800.

Further, a pocket-former discussed herein can have a frustoconical shape. Threaded fasteners discussed herein (i.e. 204, 312, 310, 402, etc.) can have slits or pores along the helical threading to improve the speed at which the fastener can facilitate joining of any given members, reducing worker fatigue and the misplacement of the post-tensioning system that could result. Additionally, the collar of the of anchor can abut an interior surface of a pocket-former when the two members have been coupled or engaged, and such coupling or engagement can form a critically-protective seal between the inner surface of the anchor and the slurry. In this manner, a clean pocket can be formed that protects the anchor and tendon from unwanted debris, thus allowing the jack to tension the wedges of the anchor onto a tendon (in one embodiment, a seven-wire strand) without the risk of unwanted concrete slurry, dirt, or rust entering the inside the anchor or pocket and interfering with the connection between the wedges and tendon. The presence of concrete slurry, dirt, or rust could otherwise cause the wedges of the anchor to be misaligned, causing the mechanical connection between the tapered bearing surface of the anchor and the seven-wire strand to be unstable. This could cause the strand to slip back into the sheathing or worse—the wedges could only seat momentarily and then release during final inspection or at later date, causing the slab to become unstable and ultimately threatening health and safety.

Further, the present disclosure offers the following advantages:
1. Providing a post-tensioning system that facilitates connection to, for example, a form board, without the use of nails;
2. Providing a method of post-tensioning that mitigates a risk of jeopardizing encapsulation of an anchor that could ultimately lead to corrosion;
3. Increasing efficiency of post-tensioning methods and systems by facilitating connection to a form board without the use of nails or other components whose installation is arduous, slow, and potentially hazardous to members of the system;
4. Enhanced pocket-forming and post-tensioning by providing a pocket-former that facilitates connection of an anchor to a form without nails, and without having to couple a bolt member directly to an anchor member;
5. Providing a new use for a pocket-former by enabling the pocket-former to facilitate connection of an anchor to a form; and
6. User-friendly post-tensioning system that utilizes easy-to-operate couplings and mechanisms to facilitate easier and faster post-tensioning.

What is claimed is:

1. A post-tensioning system comprising:
an anchor;
a pocket-former comprising a first end and a second end; and
a bolt comprising a first end, a second end, and a flange positioned between the first end of the bolt and the second end of the bolt;
wherein the first end of the pocket-former is configured to engage the anchor;
wherein the second end of the pocket-former further comprises an outer tube and an inner tube, the outer tube configured to abut a first side of a form, the form comprising an aperture therethrough;
wherein the inner tube comprises a first coupling part of a two-part coupling, the second end of the bolt comprises a second coupling part of the two-part coupling; and
wherein the bolt is configured to secure the second end of the pocket-former to the first side of the form when the second end of the bolt is inserted from a second side of the form through the aperture and engages the two-part coupling between the second end of the bolt and the second end of the pocket-former until the flange abuts the second side of the form.

2. The system of claim 1, wherein the two-part coupling comprises a threaded connection between the second end of the pocket-former and the second end of the bolt.

3. The system of claim 1, wherein the two-part coupling consists of one of a group of couplings including threads, a latch, a lip, a seal, a clamp, and a quick-connect.

4. The system of claim 1, wherein the first end of the pocket-former is configured to form a seal with the anchor when the first end of the pocket-former is engaged with the anchor.

5. The system of claim 1, further comprising a cap, wherein the cap is configured to sealingly connect with a first end of the anchor.

6. The system of claim 5, wherein the cap is configured to sealingly connect to the first end of the anchor by inserting a first end of the cap into a collar portion of the first end of the anchor.

7. The system of claim 6, wherein the cap further comprises an O-ring disposed around the outer diameter of the first end of the cap, and wherein the O-ring provides a seal between the interior of the collar portion and the outer diameter of the first end of the cap.

8. The system of claim 6, further comprising a threaded connection between the exterior of the cap and the interior of the collar portion.

9. The system of claim 6, wherein the cap further comprises a second end, and wherein the second end of the cap comprises a nodule configured to facilitate gripping the second end of the cap.

10. The system of claim 9, wherein the nodule is configured to receive a sheared end of a tendon protruding into the first end of the anchor from a second end of the anchor.

11. The system of claim 1, wherein the first side of the form is substantially parallel to a plane defined by a first end of the anchor.

12. The system of claim 1, further comprising a washer configured to fit between the flange of the bolt and the second side of the form, wherein the form is at an angle relative to a plane defined by a first end of the anchor;
wherein the outer tube of the second end of the pocket-former defines a plane substantially parallel to the first side of the form and a first side of the washer; and wherein the flange of the bolt, a plane defined by a second side of the washer, and the plane defined by the first end of the anchor are substantially parallel.

13. The system of claim 1, wherein the diameter of the first end of the pocket-former is smaller than the diameter of the outer tube of the second end of the pocket-former.

14. The system of claim 13, wherein the outer tube comprises a frustoconical shape.

15. A method of providing support to a masonry structure, the method comprising the steps of:
providing an anchor having a first end configured to face a first side of a masonry form;
engaging the first end of the anchor with a first end of a pocket-former;
abutting an outer tube of a second end of the pocket-former against the first side of the masonry form, the masonry form further comprising an aperture with a smaller diameter than the diameter of the outer tube of the second end of the pocket former; and
securing the pocket former to the masonry form with a bolt comprising a first end configured to be inserted from a second side of the masonry form through the aperture in the masonry form into engagement with an inner tube of the second end of the pocket-former, the bolt further comprising a flange distal to the first end of the bolt;
wherein the engagement between the inner tube of the second end of the pocket-former and the first end of the bolt member secures the pocket-former to the masonry form through the aperture in the masonry form when the flange is tightened against the masonry form on the side of the masonry form opposite the pocket former.

16. The method of claim 15, further comprising the steps of:
surrounding the anchor and pocket-former with a masonry slurry;
allowing the masonry slurry to set into hardened masonry;
removing the bolt and masonry form; and
engaging a cap with the anchor;
wherein the cap is configured to provide a sealed connection with the anchor.

17. The method of claim 15, wherein the first end of the pocket-former comprises a first part of a coupling, the first end of the anchor comprises a second part of the coupling; and
wherein the step of engaging the first end of the anchor to the first end of the pocket former includes securing the coupling of the first end of the anchor and the first end of the pocket former together.

18. The method of claim 17, wherein the first part of the coupling comprises threads, the second part of the coupling comprises threads, and wherein the step of engaging the first end of the anchor to the first end of the pocket former comprises screwing the second part of the coupling to the first part of the coupling.

19. The method of claim 15, wherein the inner tube of the second end of the pocket-former is configured to extend partially through the aperture of the masonry form when the outer tube is abutted against the masonry form.

20. The method of claim 15, wherein the inner tube of the second end of the pocket-former member comprises a first part of a two-part coupling, and the first end of the bolt member comprises a second part of the two-part coupling.

21. The method of claim 20, wherein the first part of the two-part coupling comprises a first set of threads, and the second part of the two-part coupling comprises a second set of threads, and wherein screwing the first end of the bolt into the inner tube of the second end of the pocket-former until the flange and the outer tube of the second end of the pocket former are abutting the second and first sides, respectively, of the masonry form.

22. The method of claim 15, wherein the first end of the pocket-former is configured to form a seal with the first end of the anchor when the first end of the pocket-former is engaged with the first end of the anchor.

23. A pocket-former apparatus, the apparatus comprising:
a pocket-former comprising:
  a first end;
  a second end;
  an inner tube; and
  an outer tube;
an anchor comprising a first end; and
a bolt comprising a first end, a second end, and a flange;
wherein the first end of the pocket-former is configured to engage the first end of the anchor;
wherein the second end of the bolt is configured to secure the second end of the pocket-former to a first side of a form when the bolt is inserted from a second side of a form through an aperture in the form, the outer tube of the second end of the pocket former is positioned against the first side of the form, and the second end of the bolt securely engages the inner tube of the pocket-former until the flange of the bolt and the second outer tube of the pocket former exert opposite forces on the first and second sides of the form.

24. The pocket-former apparatus of claim 23, wherein the inner tube is configured to be partially inserted through the aperture from the first side of the form.

25. The apparatus of claim 23, wherein the outer tube at the second end of the pocket-former is larger in diameter than the first end of the pocket-former.

26. The apparatus of claim 25, wherein the outer tube comprises a frustoconical shape.

* * * * *